(12) United States Patent
Rohs et al.

(10) Patent No.: US 7,682,278 B2
(45) Date of Patent: Mar. 23, 2010

(54) REVOLVING TRANSMISSION

(75) Inventors: Ulrich Rohs, Roonstr. 11, 52351 Düren (DE); Christoph Dräger, Inden (DE); Werner Brandwitte, Langerwehe (DE)

(73) Assignee: Ulrich Rohs, Düren (DE)

( * ) Notice: Subject to any disclaimer, the term of this patent is extended or adjusted under 35 U.S.C. 154(b) by 0 days.

(21) Appl. No.: 12/317,028

(22) Filed: Dec. 18, 2008

(65) Prior Publication Data

US 2009/0156354 A1    Jun. 18, 2009

Related U.S. Application Data

(62) Division of application No. 10/529,606, filed as application No. PCT/DE03/03254 on Sep. 29, 2003, now Pat. No. 7,559,868.

(30) Foreign Application Priority Data

| Sep. 30, 2002 | (DE) | ................................. | 102 45 897 |
| Oct. 7, 2002 | (DE) | ................................. | 102 46 655 |
| Jan. 30, 2003 | (DE) | ................................. | 103 03 891 |
| Jan. 30, 2003 | (DE) | ................................. | 103 03 896 |
| Jan. 31, 2003 | (DE) | ................................. | 103 04 094 |
| May 20, 2003 | (DE) | ................................. | 103 23 109 |

(51) Int. Cl.
  *F16H 37/02* (2006.01)
(52) U.S. Cl. ..................................................... 475/215
(58) Field of Classification Search .................. 476/7, 476/53; 474/8, 18, 28
  See application file for complete search history.

(56) References Cited

U.S. PATENT DOCUMENTS

| 299,231 | A |   | 5/1884 | Laird |        |
| 1,069,182 | A |   | 8/1913 | Remy et al. |        |
| 1,637,664 | A |   | 8/1927 | Stoeckicht |        |
| 1,709,346 | A | * | 4/1929 | Garrard | ................. 476/53 |
| 1,868,676 | A |   | 7/1932 | Stoeckicht |        |
| 2,545,152 | A |   | 3/1951 | Haidegger |        |
| 2,583,790 | A |   | 1/1952 | Mikina |        |
| 2,660,897 | A |   | 12/1953 | Niedhart et al. |        |
| 2,743,621 | A | * | 5/1956 | Beier | ..................... 476/7 |
| 3,026,736 | A |   | 3/1962 | Petzhold |        |
| 3,048,046 | A | * | 8/1962 | Cosby | ..................... 476/7 |
| 3,347,106 | A |   | 10/1967 | Flichy |        |
| 3,347,107 | A | * | 10/1967 | Flichy | ..................... 476/7 |
| 3,375,733 | A |   | 4/1968 | Browning |        |
| RE27,211 | E | * | 11/1971 | Rounds | ..................... 476/7 |

(Continued)

FOREIGN PATENT DOCUMENTS

DE    745 147    2/1944

(Continued)

OTHER PUBLICATIONS

"Machine Tool & Hydraulics", No. 1, 2002 (Total Issue No. 175).

(Continued)

*Primary Examiner*—Dirk Wright
(74) *Attorney, Agent, or Firm*—Collard & Roe, P.C.

(57) ABSTRACT

In a revolving transmission having at least two revolving transmission elements which may transmit a torque frictionally, at least one gap, which is preferably only filled with a liquid, is provided between the transmission elements at least during operation.

29 Claims, 30 Drawing Sheets

U.S. PATENT DOCUMENTS

| | | | |
|---|---|---|---|
| 3,677,109 A | | 7/1972 | Stuemky |
| 4,136,581 A | * | 1/1979 | Winter et al. ............... 475/210 |
| 4,238,976 A | | 12/1980 | Kemper |
| 4,382,188 A | | 5/1983 | Cronin |
| 4,449,415 A | | 5/1984 | Groenhof |
| 4,543,852 A | | 10/1985 | Svab et al. |
| 4,559,841 A | | 12/1985 | Chambers |
| 4,577,523 A | * | 3/1986 | Groenhof ....................... 476/7 |
| 4,644,821 A | | 2/1987 | Sumiyoshi et al. |
| 4,955,852 A | | 9/1990 | Morisawa |
| 5,069,078 A | | 12/1991 | Fairbanks |
| 5,073,157 A | | 12/1991 | Herscovici |
| 5,112,283 A | | 5/1992 | Miyata et al. |
| 5,213,011 A | | 5/1993 | Nobumoto et al. |
| 5,230,663 A | | 7/1993 | Reniers |
| 5,662,546 A | | 9/1997 | Takata et al. |
| 5,681,892 A | | 10/1997 | Weidner |
| 5,700,196 A | | 12/1997 | Banemann et al. |
| 5,766,105 A | | 6/1998 | Fellows |
| 5,924,953 A | | 7/1999 | Rohs |
| 5,984,820 A | * | 11/1999 | Wedeniwski ................ 475/193 |
| 6,056,661 A | * | 5/2000 | Schmidt ...................... 475/210 |
| 6,093,131 A | * | 7/2000 | Rohs ............................ 476/53 |
| 6,139,465 A | | 10/2000 | Holliday |
| 6,241,635 B1 | | 6/2001 | Schmid et al. |
| 6,251,038 B1 | | 6/2001 | Ishikawa et al. |
| 6,277,048 B1 | * | 8/2001 | Rohs ............................ 476/53 |
| 6,287,232 B1 | | 9/2001 | Sakai et al. |
| 6,379,275 B1 | * | 4/2002 | Serkh ........................... 474/49 |
| 6,503,166 B1 | * | 1/2003 | Van Druten et al. ......... 475/210 |
| 6,506,136 B2 | | 1/2003 | Schmid et al. |
| 6,623,399 B2 | * | 9/2003 | Fey et al. ....................... 476/7 |
| 6,875,152 B2 | * | 4/2005 | Iwatuki et al. ................ 477/44 |
| 6,908,406 B2 | | 6/2005 | Overbay et al. |
| 7,048,667 B2 | * | 5/2006 | DeVincent et al. .......... 475/214 |
| 7,077,777 B2 | | 7/2006 | Miyata et al. |
| 7,097,583 B2 | | 8/2006 | Lauinger et al. |
| 7,232,396 B2 | * | 6/2007 | Reisch et al. ............... 475/214 |
| 2006/0194667 A1 | * | 8/2006 | Rohs et al. .................... 476/61 |
| 2006/0217227 A1 | * | 9/2006 | Rohs et al. .................... 476/52 |
| 2006/1021722 | * | 9/2006 | Rohs et al. .................... 476/52 |
| 2007/0004556 A1 | * | 1/2007 | Rohs et al. .................. 477/130 |

FOREIGN PATENT DOCUMENTS

| | | |
|---|---|---|
| DE | 23 36 337 A1 | 1/1975 |
| DE | 38 35 052 A1 | 5/1989 |
| DE | 042 02 200 | 8/1993 |
| DE | 42 04 200 A | 8/1993 |
| DE | 196 07 812 A1 | 9/1996 |
| DE | 197 17 290 A1 | 10/1998 |
| DE | 199 09 347 | 9/1999 |
| DE | 200 20 562 U1 | 6/2001 |
| EP | 0 105 515 | 4/1984 |
| EP | 0 321 621 A1 | 6/1989 |
| EP | 0 878 641 A | 11/1998 |
| EP | 0 942 199 | 9/1999 |
| EP | 09 80 993 A2 | 2/2000 |
| EP | 1 114 951 A2 | 7/2001 |
| EP | 1 136 724 A | 9/2001 |
| FR | 6 15 659 | 1/1927 |
| FR | 2 741 128 | 5/1997 |
| FR | 27 96 693 A1 | 1/2001 |
| FR | 2 800 826 A1 | 5/2001 |
| GB | 298676 | 10/1928 |
| GB | 343 225 | 2/1931 |
| GB | 1 499 019 | 1/1978 |
| GB | 1 525 402 A | 9/1978 |
| GB | 2 160 598 A | 12/1985 |
| GB | 2 180 020 | 3/1987 |
| JP | 1-105057 | 4/1989 |
| JP | 6174036 A | 6/1994 |
| JP | 10-205600 A | 8/1998 |
| JP | 10-331935 A | 12/1998 |
| JP | 2000130531 A | 5/2000 |
| JP | 2000 291759 | 10/2000 |
| JP | 2000-291773 A | 10/2000 |
| JP | 2001-088585 A | 4/2001 |
| JP | 2002-48213 | 2/2002 |
| JP | 2003 0 28 257 A | 1/2003 |
| RU | 2 079 017 C1 | 5/1997 |
| RU | 2 133895 C1 | 7/1999 |
| RU | 2141983 | 11/1999 |
| SU | 1557395 A2 | 4/1990 |
| WO | WO 01/20192 | 3/2001 |

OTHER PUBLICATIONS

Wirkungsgradoptimierte Variator-Auslegung eines Wälzgetriebe-CVT in Bauart Kegel-Ring-Getriebe , Michael Kammler, Aachen: Mainz, 2001.

International Search Report.

* cited by examiner

REVOLVING TRANSMISSION

CROSS REFERENCE TO RELATED APPLICATIONS

Applicants claim priority under 35 U.S.C. §119 of German Application Nos. 102 45 897.9, 102 46 655.6, 103 03 891.4, 103 03 896.5, 103 04 094.3, 103 23 109.9 filed Sep. 30, 2002, Oct. 7, 2002, Jan. 30, 2003, Jan. 30, 2003, Jan. 31, 2003 and May 20, 2003, respectively. Applicants also claim priority under 35 U.S.C. §365 of PCT/DE2003/003254 filed Sep. 29, 2003. The international application under PCT article 21(2) was not published in English. Applicants also claim priority under 35 U.S.C. 120 because this is a Divisional Patent Application of U.S. patent application Ser. No. 10/529,606 filed Feb. 14, 2006 now U.S. Pat. No. 7,559,868.

The present invention relates to a revolving transmission having at least two revolving transmission elements, which may transmit a torque frictionally. In particular, the present invention relates to transmissions having two revolving transmission elements, each of which has at least one running surface for a revolving coupling element which couples the two revolving transmission elements. At least one of the running surfaces of the two revolving transmission elements preferably has at least two running paths for the coupling element having different running radii in this case, so that in this way a continuously and/or nearly continuously variable transmission may be implemented.

Arrangements of this type are known, for example, from EP 0 878 641 A1, which relates to conical friction ring transmissions, in which two cones having opposing conical angles are mounted so they may revolve in such a way that a constant distance remains between them, in which a ring revolves enclosing one of the cones as the coupling element. However, it has been shown that an arrangement of this type leads to relatively great wear and/or only insufficient transmission performance and/or, particularly at higher loads, to destruction of the transmission.

It is therefore the object of the present invention to provide a revolving transmission having at least two revolving transmission elements, which may transmit a torque frictionally, having a better transmission behavior and/or a longer service life.

To achieve this object, the present invention suggests a revolving transmission having at least two revolving transmission elements which may transmit a torque frictionally, in which a gap is provided between the transmission elements at least during operation.

Through contactless operation of this type, a transmission of this type may be built with extremely low wear, a suitable interaction mechanism being provided between the corresponding transmission elements and the coupling element for force and/or torque transmission. Preferably coupling via a fluid and/or liquid is provided, which remains in the gap in spite of a pressure and transmits the necessary forces and/or torques. However, other interaction mechanisms, such as electrostatic or magnetic arrangements, may also be provided.

The present invention is particularly suitable for conical friction ring transmissions, in which the gap and/or the liquid is located between the cones and the friction ring at least during operation. In this way, the ring may also be positioned for a desired transmission ratio without anything further. The present invention is also suitable, however, for other continuously variable transmissions in which the transmission elements interact with one another frictionally. In the present context, the term "frictional interrelationship" between transmission elements describes any interrelationship in which torques are transmitted from one transmission element to the other transmission element without a positive connection existing between these transmission elements for this purpose. Typically, a certain slip, at least above relatively high limiting torques, exists in a frictional interrelationship, a slip of this type frequently occurring non-destrictively and the corresponding transmission typically being operated below these limiting torques.

Alternatively and/or cumulatively to the gap described above, a liquid, particularly a silicone oil, which comprises methyl siloxanes, dimethyl diphenyl siloxanes, and/or methyl phenyl siloxanes having phenyl groups, may be used as the liquid with which at least one of the revolving transmission elements and/or a coupling element, such as a friction ring, is wetted. In particular, dimethyl polysiloxanes, which contain, for example, phenyl-alkyl groups or fluoroalkyl groups, may also be used. In this case, dimethyl siloxy groups may particularly alternate therein with diphenyl siloxy groups individually or as siloxane blocks.

Liquids of this type are generally known under the term "silicone oils", which are also—non-specifically—generally disclosed in EP 0 878 641 A1 as a liquid for wetting the revolving transmission elements of a continuously variable transmission. Silicone oils have relatively slight lubrication properties, which has been shown to be disadvantageous in practical tests, particularly in interaction with rolling coupling elements, such as coupling rollers or friction rings, so that it is assumed that a liquid film breaks down during operation with known silicone oils. However, silicone oils are especially distinguished by a high temperature carrying capacity of their properties in comparison to other liquids.

The liquids suggested, comprising methyl siloxanes, dimethyl diphenyl siloxanes, and/or methyl phenyl siloxanes having phenyl groups, are distinguished, particularly if, for example, diphenyl siloxane blocks are incorporated into polymethyl siloxane, by high compressibility in comparison to other liquids, which presumably prevents breakdown of the film. Thus, oils may be provided which have behavior advantageous for transmissions having rolling coupling elements in their temperature/viscosity and/or temperature/compressibility behavior, it having been found that for systems of this type, liquids of any type whose viscosity and/or compressibility changes with a temperature-dependent viscosity gradient and/or compressibility gradient, which lies between the viscosity gradients and/or compressibility gradients of mineral oils and the viscosity gradients and/or compressibility gradients of dimethyl siloxanes, may very generally be advantageously used for transmissions. Using these properties, a liquid and/or an oil may sufficiently lubricate the corresponding transmission so that operating temperatures which are too high are not reached. In addition, the lubrication is not so strong that sufficient coupling between the coupling element and the corresponding transmission element would be prevented. In addition, the compressibility window described produces sufficient stability of the fluid film enclosing the components even under pressure, without uniform distribution of the liquid being prevented.

In particular, liquids having polydimethyl siloxanes, polydimethyl diphenyl siloxanes, and/or polymethyl phenyl siloxanes having phenyl groups, and/or alkyl-substituted γ-trifluoropropyl-substituted polydimethyl siloxanes may be used. "Silicones" may also be used in which organic substituents, such as 10 to 25% phenyl groups or γ-trifluoropropyl groups or other alkyl groups, are also contained as substituents in the polydimethyl siloxanes which are used.

In addition, it is cumulatively and/or alternatively especially advantageous if the corresponding liquid is stabilized in regard to is temperature and, as much as possible, changes less in regard to its properties than mineral oils do. In this way, a long service life of the transmission may be ensured, since the corresponding fluid degenerates less. Furthermore, the physical properties of the fluid remain as constant as possible even in different operating states, such as under extremely high load or extremely high speeds or even, for example, during start procedures in winter.

In regard to the phenyl siloxane units in the polydimethyl siloxanes, and/or in regard to phenyl siloxane units in siloxanes in general, these may be used both in pairs and in blocks in order to achieve the desired results. In addition, the compressibility described above is especially advantageous in cooperation with a gap remaining between the coupling element and revolving transmission element, which is filled with the corresponding liquid and is stably bridged by liquid even at high pressures. In this case, the liquid is used for force transmission, so that the shear forces arising herein may connect the coupling element and the corresponding transmission element non-positively. In addition, the high compressibility ensures that this transmission is possible even at high and/or higher torques, at which only a small gap may implement sufficiently high shear forces and a liquid film which does not break down, the gap also able to be maintained only by high pressures and a high resistance force of the liquid against pressures this high.

It is obvious that the above-mentioned considerations in regard to the gap and/or the liquid, whether relating to their temperature stability, their compressibility, and/or their viscosity, may be advantageous, even independently of the remaining features of the transmission according to the present invention, individually or together for a continuous transmission, particularly for a transmission having two transmission elements which roll on one another.

Particularly for transmission elements which are coupled per se via a friction lock or even via hydraulic, hydrostatic, or hydrodynamic, magnetic or other contactless interaction, and/or other interactions without a positive connection, it may be advantageous if, in a transmission which comprises two running paths of a transmission element for a coupling element, these running paths are provided with different surfaces in order to able to implement and/or adapt the interaction, for example, a surface pressure or something similar in a suitable way. In this case, for example, grooves or projections of different widths and/or a varying surface texture and/or surface treatment may be provided along at least one of the revolving transmission elements. In this way, for example, a surface pressure may be adapted to different radii of the transmission element. It is obvious that a surface variation of this type is advantageous in running paths on a transmission element, even independently of the remaining features of the transmission according to the present invention.

For an embodiment of the interaction which is independent of the running paths, the surface of the coupling element may also be textured. In particular, the surface may have grooves or something similar in order to influence the shear and compression forces in a suitable way in the event of a hydraulic interaction. In addition, the coupling element may also have different surfaces for different transmission elements with which it is in contact.

In order to ensure good shear force distribution, particularly in interaction with a liquid which wets the running surface of the coupling element and/or the corresponding running surface of the corresponding transmission element, without the liquid film breakdown, the coupling element may have at least one running surface having a cross-section which deviates from a straight line, preferably having a convex and/or crowned cross-section. A continuous liquid film which transmits sufficient shear forces may thus be ensured even at high pressures. The selection of the cross-section is preferably tailored to the liquid in this case. Cumulatively and/or alternatively, the cross-section for a coupling element may suitably deviate from a straight line which is only held on one side by a holding device, particularly as described below, since a one-sided holding device of this type, although it leaves the coupling element a relatively large amount of freedom, may also interact in a stabilizing way with a coupling element, which is relatively unstable because of the running surface deviating from a straight line, so that the overall system, particularly in the event of a running path change, may also be operated with a low force expenditure.

It is obvious that a surface design of the coupling element and/or the revolving transmission elements of this type may also be used advantageously, independently of the remaining features of the transmission according to the present invention, to design the interaction between the transmission element and coupling element.

In order to ensure, in a transmission having a continuously variable partial transmission, that problems in special driving situations, for example, during slow driving, in reverse gear, and/or during constant steady load, are reduced, a transmission having a continuously variable partial transmission is suggested which is distinguished by two transmission paths connected in parallel, the continuously variable partial transmission being provided in a first of the two transmission paths.

An arrangement of this type allows special driving and/or load situations to be implemented by the second transmission path, while the first transmission path may provide advantages of the continuously variable transmission. In the present context, the term "parallel connection of two transmission paths" indicates that the two transmission paths have [word missing] between a shared input-side partial transmission, such as the drive shaft or a motor or a clutch disk or something similar, and a shared output-side partial transmission, such as the main differential of a motor vehicle. Between the shared input-side partial transmission and the shared output-side partial transmission, the two transmission paths may be simultaneously operated alternately, additively, and/or differentially, in order to thus meet different requirements. It is obvious that an arrangement of this type is advantageous even independently of the remaining features of the present invention.

It may thus be advantageous if a reverse gear, a first gear, and/or an overdrive is provided in the second of the two transmission paths. For these situations, continuously variable transmissions are only usable in a limited way and with a relatively large outlay and/or are subjected to large losses, particularly in overdrive, i.e., at high speeds and low torques.

If at least one freewheel is provided between the two transmission paths, these transmission paths may be guided together without complex switching outlay and/or without complex switching and regulatory technology.

Cumulatively and/or alternatively, in a transmission which comprises a continuously variable partial transmission, the latter may be positioned between two power dividers, such as a differential gear part or a planetary gear part, at least one input of the continuously variable partial transmission being mechanically connected to at least one output of an input-side power divider and at least one output of the continuously variable partial transmission being mechanically connected to at least one input of an output-side power divider. Through an arrangement of this type, a torque transmission may be implemented so it may be enlarged and/or the adjustment range of the continuously variable partial transmission may be enlarged, this occurring at the cost of the efficiency according to the current knowledge, since the two power dividers naturally lead to losses. However, an arrangement of this type allows a significant increase in the breadth of application for continuous transmissions. In addition, the torque which must be conducted through the continuously variable partial transmission itself may thus be reduced, through which the losses may be kept within limits with a suitable implementation, since a lower torque in the continuously variable transmission, particularly if it is a conical friction ring transmission, leads to lower losses there, which correspondingly may reduce the losses in the power dividers.

Cumulatively and/or alternatively, in a transmission which also comprises at least one forward gear and at least one reverse gear, independently of the presence of a continuous transmission, a differential gear may be provided which implements this forward gear and this reverse gear, at least one assembly of the differential gear part able to be fixed alternately with the housing and/or with another assembly of the differential gear part. In this way, a transmission having a forward gear and a reverse gear may be implemented very compactly, in which, for example, a differential assembly of the differential gear is used as the input. If the central assembly of the differential is then connected to the second differential assembly, one rotational direction may be implemented. In contrast, if the second differential assembly and/or the central assembly of the differential is connected to the housing and fixed in this way, the other assembly, which is not mixed, changes its rotational direction, through which the above mentioned gear reversal may be implemented. In this way, a transmission which has a forward gear and a reverse gear may be implemented especially compactly.

In addition, cumulatively and/or alternatively, a transmission is suggested which comprises at least two transmission stages which may be switched alternately into the transmission path via a switching gear part, a first of the two transmission stages having a continuously variable partial transmission. An arrangement of this type first appears contrary to the system, since a continuous transmission is provided in order to be able to dispense with switches of any type. However, an arrangement of this type allows a continuous transmission to be used only when its advantages actually predominate. For example, relatively high torques frequently occur during startup, which significantly load a continuous transmission and/or require an excessively large design of the continuous transmission. It is thus advantageous to implement a first gear separately, for example, and only connect the continuously variable partial transmission after startup. In this case, the continuously variable partial transmission may particularly be dimensioned in such a way that before the switching procedure from one in to the other of the two transmission stages, the speed of the second transmission stage is adapted by the continuously variable transmission to the speed of the first transmission stage, so that the transition from the first transmission stage to the second transmission stage and/or even from the second transmission stage to the first transmission stage may occur continuously per se. In this way, the advantages of a continuous partial transmission may be exploited optimally, without having to accept disadvantages as may arise during startup, for example.

This is also true for states having essentially constant output and/or having essentially constant torques, in which a partial transmission which is continuously variable is not absolutely necessary per se, since speed changes may be implemented by speed changes of the motor. In operating states of this type, continuously variable partial transmissions typically have high losses—caused by slip, for example—which may be avoided by a connected transmission stage, the switching also able to be implemented in this case at operating points at which a stage change of this type is not or is only insignificantly noticeable to vehicle occupants. In particular, the continuously variable transmission may be brought into a suitable operating situation for this purpose. For example, it is also conceivable to engage and/or disengage a transmission stage of this type via a freewheel.

In addition, the transmission stage, which may be engaged in addition to the transmission stage comprising the continuously variable partial transmission, may comprise a differential gear element which is used, for example, to switch between forward and reverse gears and for a startup gear. Particularly in an embodiment of this type, it is advantageous if the assemblies of the differential gear element which are necessary for switching between forward and reverse gears are fixed via friction clutches, through which the most careful and uniform changeover possible may be implemented.

In a transmission having two transmission stages, which may be switched alternately into a transmission path via a switching gear part, a first of the two transmission stages comprising a continuously variable partial transmission, the switching gear part may couple the continuously variable partial transmission to a pump wheel of a Trilok converter, or another assembly which is connected directly to a motor output shaft, and the second transmission stage may be coupled to a turbine wheel of the Trilok converter, or another connectable motor output assembly. In this way, the motor output, particularly in normal operating states, may be conducted directly to the continuously variable partial transmission, while, particularly during startup procedures, high torques may be transmitted to the second transmission stage, so that it is unloaded in relation to the continuously variable partial transmission. This is particularly true in the interaction with the turbine wheel of a Trilok converter, in which a torque overload naturally occurs, which would otherwise significantly load the continuously variable partial transmission.

Particularly in combination with an electric motor, a continuously variable partial transmission having coaxially positioned drive and output is advantageous even independently of the remaining features of the transmission according to the present invention, since in an arrangement of this type, torques acting on the housing may be minimized in an especially compact way. Preferably, a differential gear part is provided in the coaxial output, which is in turn driven by an output of the continuous transmission. This arrangement is especially compact, since the output of the continuous transmission acts without further intermediate stages on a differential gear, which must be provided anyway, particularly in motor vehicles. In addition, gear wheels or other transmissions are typically required anyway in order to provide a coaxial drive and output, so that no additional components become a necessary due to the differential gear part. The arrangements described above are particularly suitable in connection with an electric motor drive, it initially appearing contrary to the system to connect an electric motor to a continuously variable transmission, since the speed of an electric motor is nearly arbitrarily adjustable anyway. However, the continuously variable transmission allows an electric motor to be operated at speeds at which it has favorable torque/current intensity ratios. In this way, the overall efficiency of the corresponding drivetrain may be elevated and/or the amount of current necessary, particularly at low speeds, may be reduced.

A transmission according to the present invention, but also a different continuously variable transmission, may be mechanically connected at the drive or output side to a disengagement point, such as a startup clutch, a converter, a friction disk, a hydraulic clutch, and/or a synchronization. This arrangement, which is contrary to a continuously variable transmission per se, has the advantage that the continuous transmission and/or the drive may be cared for in startup procedures, so that the service life is extended. A startup clutch and/or disengagement point provided on the output side is especially advantageous, since in an arrangement of this type a stoppage adjustment is possible with the motor running. In addition, a startup clutch and/or disengagement point on the drive side allows connection of other transmission elements if they are necessary.

The output of the two partial transmissions preferably engages at a drive of the following transmission path and the partial transmissions are preferably guided together again in this way. The transmission is built especially compactly if this drive of the following transmission path is the main differential, i.e., the differential which connects and drives the two wheels of a driven motor vehicle axle. A compact construction of this type is reflected in a lower piece count, through which the costs may be reduced. In addition, a compact construction of this type results in a smaller overall volume, through which the total costs for the motor vehicle may be reduced further.

Depending on the concrete implementation, it may be advantageous if one of the two partial transmissions comprises a reverse gear, possibly having a first gear, while the second partial transmission has the continuously variable transmission, particularly a conical friction ring transmission. Particularly if the first of these partial transmissions dispenses with a separate first gear, this results in an especially compact construction having the above-mentioned advantages.

The two partial transmissions may preferably each be engaged and/or disengaged. This may particularly be performed by interrupting the particular partial transmission path via a clutch. In a first approximation, it plays no role for this purpose at which point this interruption is performed; it may be both on the drive side and on the output side, the transmission elements positioned beyond this disengagement being able to run on unloaded without anything further, so that the two partial transmission paths do not each have to be provided with two clutches. To avoid losses because of freewheeling transmission elements, however, multiple clutches may be provided in the partial transmission paths. However, the latter increases the number of components and the installation space necessary, which in turn has effects in regard to cost.

It is obvious that a construction of this type of a continuous transmission having a parallel partial transmission is advantageous even independently of the remaining features of the present invention. This is particularly true in connection with a conical friction ring transmission as the continuous transmission, since in this way the advantages of a rotational direction reversal caused by the conical friction ring transmission may be implemented very effectively with the other partial transmission in a compact way.

In regard to a compact construction, it is additionally suggested, in a continuously variable transmission, particularly in a conical friction ring transmission, that a clutch element, which is used for engaging and/or disengaging the transmission path comprising the continuously variable transmission, be provided inside one of the continuously variable transmission elements, or example, Inside a cone, of the particular continuously variable transmission. In a continuously variable transmission, relatively large interaction surfaces must be provided on the essential transmission elements, so that a corresponding variability may be ensured. Through the arrangement of a clutch element of this type within the transmission elements, which comprise these large interaction surfaces, significant overall space may be saved, since the otherwise unused overall space inside these transmission elements may be used. It is obvious that an arrangement of this type of a clutch element shows the corresponding advantages in a continuously variable transmission even independently of the remaining features of the present invention.

In addition, it is frequently necessary in transmissions having two transmission elements revolving on different axes to brace them against one another via a pressure device in order to provide sufficient interaction forces between the two transmission elements. This is also particularly true for continuously variable transmissions, particularly if they interact frictionally, the pressure possibly being selected as a function of the torque to be transmitted.

In an arrangement of this type, it may be advantageous, independently of the remaining features of the present invention, to provide a clutch element which alternately disengages these two transmission elements from a third transmission element by opening and/or engages them to this third transmission element by closing, so that the particular transmission path may be engaged alternately to an overall transmission. In an arrangement of this type, the forces necessary to close the clutch element are preferably applied by the pressure device. It is thus advantageous if the clutch element is positioned in the force path of the pressure.

In an arrangement of this type, it is sufficient to open the clutch to compensate for the pressure at a suitable point, so that the pressure no longer loads the corresponding clutch. In this way, the corresponding clutch opens and the two transmission elements are accordingly disengaged. Particularly if the pressure device is activated as a function of torque, this directly results in the pressure being reduced since, because of the open clutch, a torque is no longer transmitted. In this way, the forces to be applied for opening are directly reduced to a significant extent. In addition, the reduction of the pressure also causes a reduction of the losses which may be caused by transmission elements which may possibly still be freewheeling. To close the clutch, the corresponding counter-force merely has to be reduced, so that the pressure device is again active. Therefore, no additional assemblies are necessary to close the clutch.

Furthermore, cumulatively and/or alternatively, a continuously variable transmission, particularly a conical friction ring transmission, having a reverse gear provided behind the output in series with the remaining transmission, is suggested. An arrangement of this type has the advantage that the transmission may be operated using a constant rotational direction, which is advantageous for the continuously variable transmission in regards to its activation and/or in regard to the adjustment of the friction ring. In addition, this arrangement also allows the reverse gear to be varied continuously.

In regard to the arrangement of the reverse gear, the terms "in series", "in front", and/or "behind" relate to the flow of force in the drivetrain comprising a continuous transmission. Thus, according to the present invention, the reverse gear is to be provided in series on the side of the continuously variable transmission facing away from the motor in the drivetrain.

The reverse gear preferably includes an epicyclic gear having at least one revolving gear mount, which mounts at least one transmission element of the epicyclic gear and may be fixed alternately with a housing and/or with a revolving transmission element. Through an arrangement of this type, a reverse gear is provided which—as required—may be switched even during the rotation of the drive, i.e., even during the rotation of the conical friction ring drive and/or the continuously variable transmission, by alternately fixing the revolving transmission element correspondingly, fixing of this type able to be performed appropriately carefully through suitable clutches and/or synchronizations. A changeover capability of this type is particularly tailored to the requirements of a conical friction ring transmission, which may only have its transmission ratio varied in the rotating state.

The reverse gear may particularly comprise a planetary gear having planet wheels, sun wheel, and external wheel, of which a first transmission element is mechanically connected to the output of the continuously variable transmission and a second transmission element is mechanically connected to the output of the overall arrangement made of the continuously variable transmission and reverse gear, while the third transmission element may at least be fixed in regard to one degree of freedom in relation to a housing. A planetary gear has the advantageous property that when one of the transmission elements is fixed—external wheel, sun wheel, planet wheels, the latter advantageously maintaining their intrinsic rotation capability—the particular other transmission elements may revolve further and interact with one another in accordance with the transmission ratios resulting therefrom. In particular, a corresponding fixing of a transmission element, particularly in regard to a degree of freedom, causes a substantial change of the relative speeds between the remaining two transmission elements, so that this change of the relative speed may be used to control the reverse gear.

The latter may particularly be ensured if the planet wheels are the third transmission element. If the planet wheels are fixed in their rotational degree of freedom around the corresponding sun wheel in a planetary gear, a reverse in direction immediately occurs between the external wheel and the sun wheel, through which a corresponding reverse gear may be implemented, if the particular forward gear is implemented with correspondingly running planet wheels, transmission ratios—if necessary—able to be selected in a suitable way through the planetary gear.

The overall arrangement, made of the continuously variable transmission and/or particularly of the conical friction ring transmission and reverse gear, is built especially compactly if the first transmission element is driven by a pinion revolving with the output cone of the conical friction ring transmission. An arrangement of this type ensures immediate and direct force and/or torque flow between the conical friction ring transmission and the reverse gear, so that the overall arrangement may be built extremely compactly and therefore extremely cost-effectively for modern motor vehicles.

In regard to the latter requirement, it may be cumulatively and/or alternatively advantageous if the second transmission element revolves connected to the revolving mount of a differential. In particular in connection with the use in a motor vehicle, the main differential may thus be advantageously used, so that the reverse gear is integrated immediately and directly into the differential a compact construction resulting particularly in connection with a conical friction ring transmission, independently of the drive-side embodiment of the reverse gear.

Particularly in regard to normal operation, it is advantageous if the first and the second transmission elements may be fixed with one another. Depending on the concrete embodiment of the switching process in regard to the reverse gear, an adjustment of this type may also be advantageously used in other ways in order to fix a desired operating state of the planetary gear. Because the first and the second transmission elements may be fixed with one another, a direct force flow via the planetary gear is ensured, so that in this operating state the planetary gear operates essentially without loss and the overall arrangement operates with an extremely high efficiency, particularly in regard to a forward gear. The alternate fixing of the third transmission and the two first transmission elements is preferably coupled appropriately, so that the planetary gear revolves reliably in each of its states. It is especially advantageous in this regard if the first and second transmission elements are formed by the external wheel and sun wheel of the planetary gear, respectively, and the third transmission element is formed by the planet wheels, since in this way the necessary interaction between the transmission elements may be implemented very simply and compactly. This is particularly true if the second transmission element is connected directly to the revolving mount of the differential and/or is implemented in one piece therewith and/or the first transmission element is driven directly by a pinion running with the output cone. In an embodiment of this type, the overall arrangement, particularly in typical motor vehicle drives, all of which are implemented with equidirectional drives because of the high piece counts and variations in the complementary motor vehicle classes, leads to an extremely compact and therefore cost-effective transmission, which is even usable in extremely small vehicles.

Greatly varying types of fixing, such as friction-lock or positive connections, may be advantageously applied for fixing the revolving transmission mount and/or the planet wheels or the third transmission element in relation to the housing in regard to a degree of freedom, for example. Friction lock connections, which allow a smooth transition and which—depending on the concrete embodiment—even allow switching on the reverse gear during rotation, have been shown to be particularly advantageous. However, the latter is not advantageous for every application because of the relatively high forces and friction losses, so that a startup clutch between the motor and the conical friction ring transmission may be advantageous in cases of this type in particular. Depending on the concrete application, clutches, slanted brakes, synchronizations, and similar arrangements may be suitable for the fixing, as are generally typical in connection with well-known transmissions.

It is obvious that an arrangement of this type of a reverse gear is also advantageous cumulatively with and/or alternatively to the features of the present invention in order to provide a transmission with the corresponding advantages described above. The degree of compactness and therefore the number of assemblies used and/or the cost reduction resulting therefrom and/or the rotational direction of the motor are particularly in the foreground in this case.

In order to provide a continuously variable transmission which may also transmit higher torques reliably and with low losses, it is suggested that a transmission of this type be provided, cumulatively and/or alternatively to the above-mentioned features, with at least two continuously variable partial transmissions which are positioned in parallel in a transmission path, the two continuously variable partial transmissions being switched via a summation gear at an input and/or output element.

The use of a summation gear, also called a superposition gear, has the advantage that identical speeds and/or exactly fixed speeds for one of the transmission elements of the partial transmissions, as are necessary in the related art, are not required. Rather, both partial transmissions provide their own, speed-dependent contribution to the resulting speed of the summation gear. The arrangement according to the present invention thus allows both partial transmissions to be activated and also regulated separately, and therefore uses the advantages which result from disassembly of a continuously variable transmission into two continuously variable partial transmission, such as dividing the torque onto the two partial transmissions, without having to accept the disadvantages which result from a forced speed, such as friction losses or increased regulating cost, because of this.

The switching of the two partial transmissions via the summation gear, which is asymmetrical and therefore free per se, therefore causes advantages in an unexpected way in regard to the transmission conception and/or usage, particularly in regard to the efficiency and in regard to the requirements on the controller, which is not possible in the event of symmetry, as is forced by the coupling of the planet wheels of a planetary gear.

Typical representatives of a summation gear according to the present invention are, for example, planetary gears, in which two of the three gear components (planet wheels, sun wheel, external wheel) are connected to the two partial transmissions and the third gear component is used as the output and/or drive, the planet wheels being used together as a gear components, and/or a differential, in which the two partial transmissions are each connected to one of the differentiating elements of the differential.

The two continuously variable partial transmissions may have a shared transmission element on their side facing away from the summation gear. This may be, for example, a shared input shaft or a shared output shaft. This may also particularly be a direct transmission element of the two continuously variable transmissions, which is used together by both partial transmissions. For this purpose in conical friction ring transmissions, for example, one of the cones suggests itself as the shared transmission element. Through an embodiment of this type, a transmission of this type is built relatively compactly and cost-effectively, since the total number of the elements of the corresponding transmission may be minimized through the double use.

In the present context, the term "the side facing away from the summation gear" refers to a direction in the transmission path which is defined by the force flow through the transmission and does not absolutely have to correspond with the geometric and/or spatial relationships.

Manifold continuously variable transmissions have a main transmission plane, in which the essential assemblies, such as input and output shaft, input and output cones, or similar rotationally-symmetric bodies, are positioned and define a transmission plane in this way. A transmission according to the present invention is built especially compactly if the two main transmission planes of the two partial transmissions are positioned parallel to one another. An especially flat construction may be achieved if the two partial transmission planes are identical. A transmission according to the present invention embodied in this way is constructed extremely flat and is additionally capable of countering even relatively large torques. Among other things, a transmission of this type is thus particularly suitable for small trucks having diesel engines, since it is especially well designed in regard to its overall space for attachment under a loading surface, for example, and in addition may counter the high torques of modern diesel engines without anything further.

In addition, a further adjustable partial transmission, such as a switching gear and/or a reverse gear, may be provided between at least one of the continuously variable partial transmissions and the summation gear. Through an arrangement of this type, transmissions having a very broad drive behavior, particularly with the possibility of continuous forward and reverse drive, may be implemented. In particular, it is possible to feed back a transmission of this type, even with the drive running, in such a way that the output stops without torque.

Even if the present invention significantly increases the efficiency of the overall transmission in relation to transmissions according to the related art, continuously variable transmissions, particularly under relatively constant operating conditions, such as after a startup procedure or on a highway or freeway, display relatively high losses. In order to avoid losses of this type, particularly under operating conditions in which a continuously variable transmission is not absolutely necessary, it is advantageous if at least one of the continuously variable transmissions may be bypassed. In this way, for example, under the above-mentioned operating conditions, the continuously variable partial transmission having its relatively high losses may be bypassed, so that under these operating conditions the efficiency is increased. It is obvious that the use of two continuously variable transmissions of this type is advantageous even independently of the remaining features of the present invention.

Further advantages, goals, and properties of the present invention will be explained on the basis of the following description of the attached drawing, in which exemplary transmissions are illustrated. In the drawing:

FIG. 27a shows a schematic section through a coupling element and/or friction ring FIGS. 27b through e show different surface designs in detail enlargements of the detail A in FIG. 27a;

Figure 1:
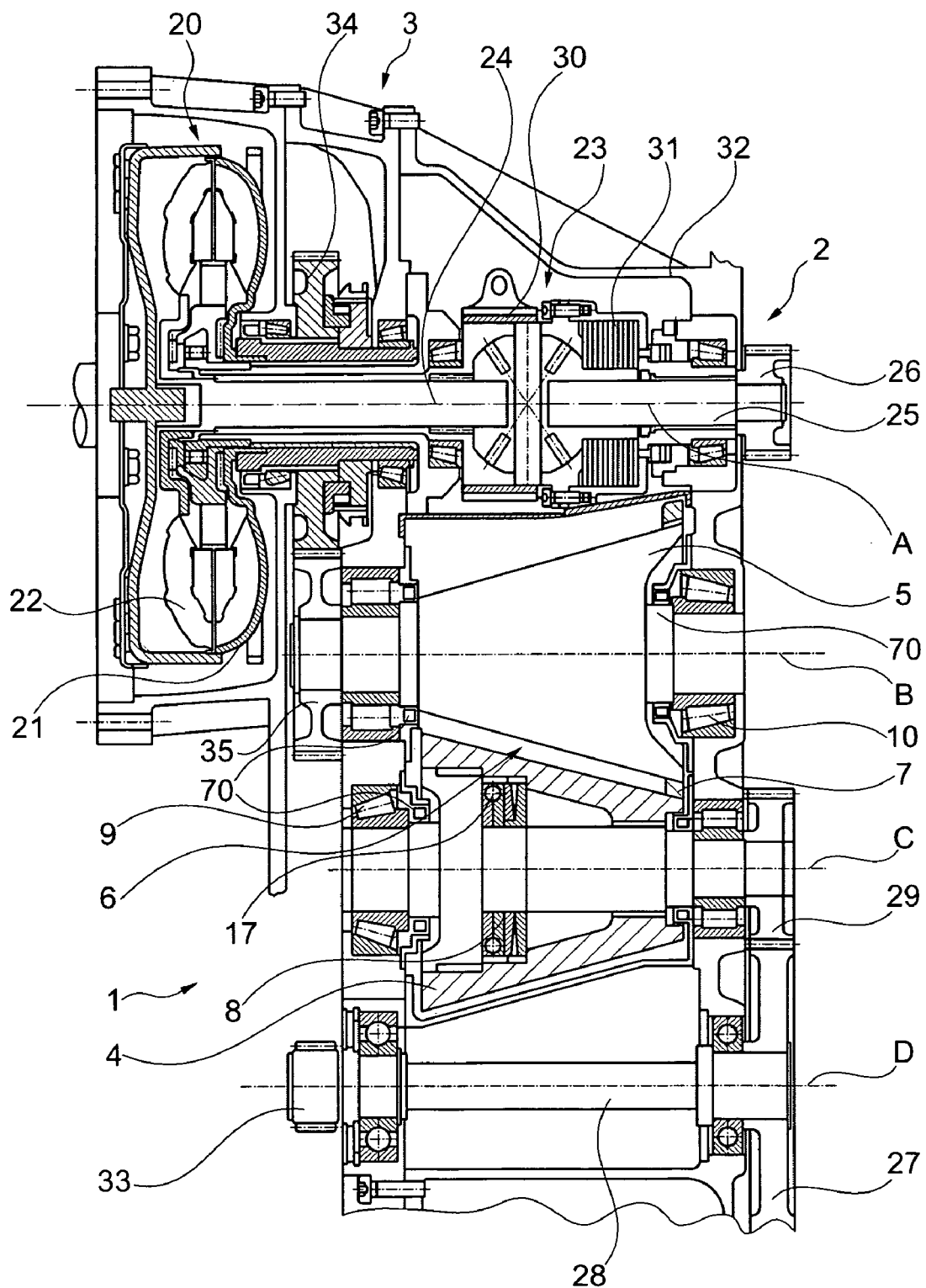
FIG. 1 shows a first transmission in section along the line I-A-B-C-D-I in FIG. 2.
Figure 28:
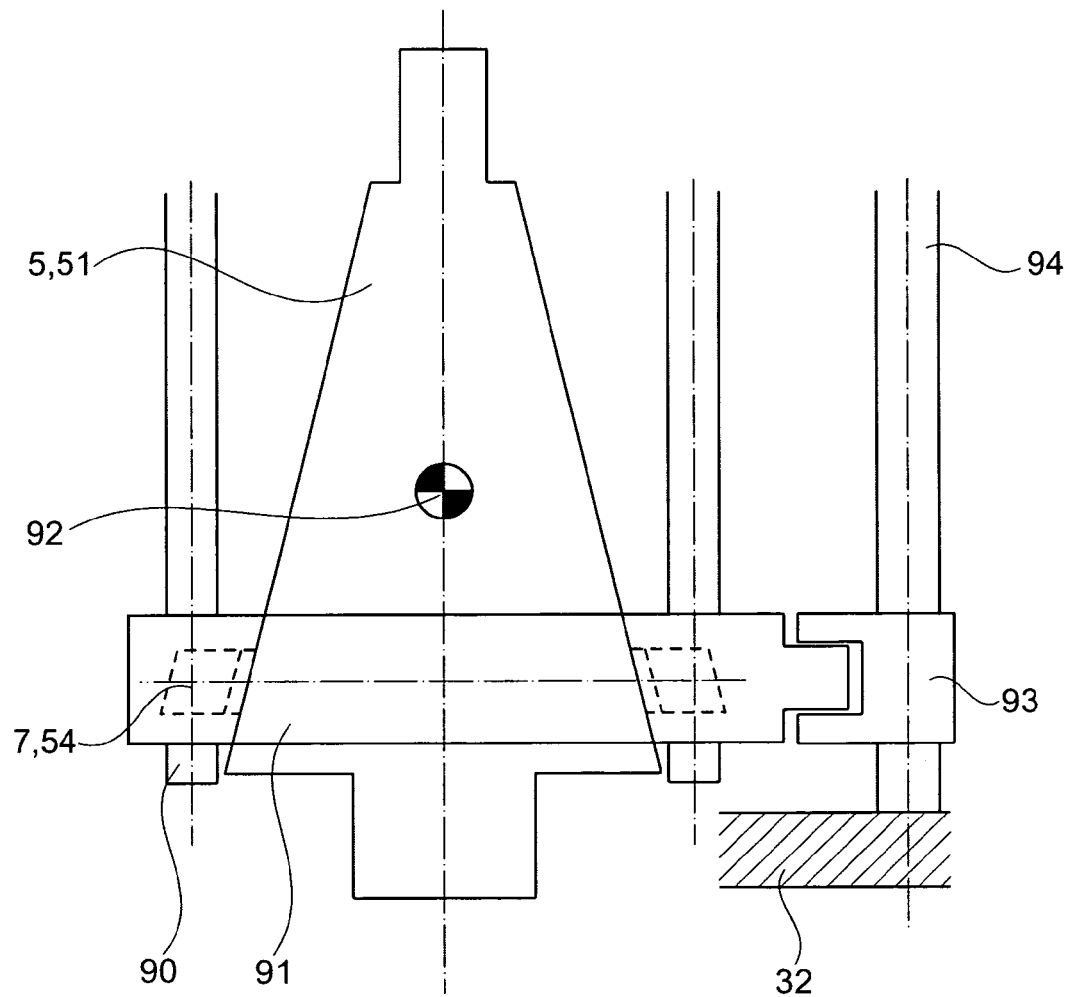
FIG. 28 shows the actuating bridge of the transmission in FIG. 1 in a schematic top view.
Figure 29:
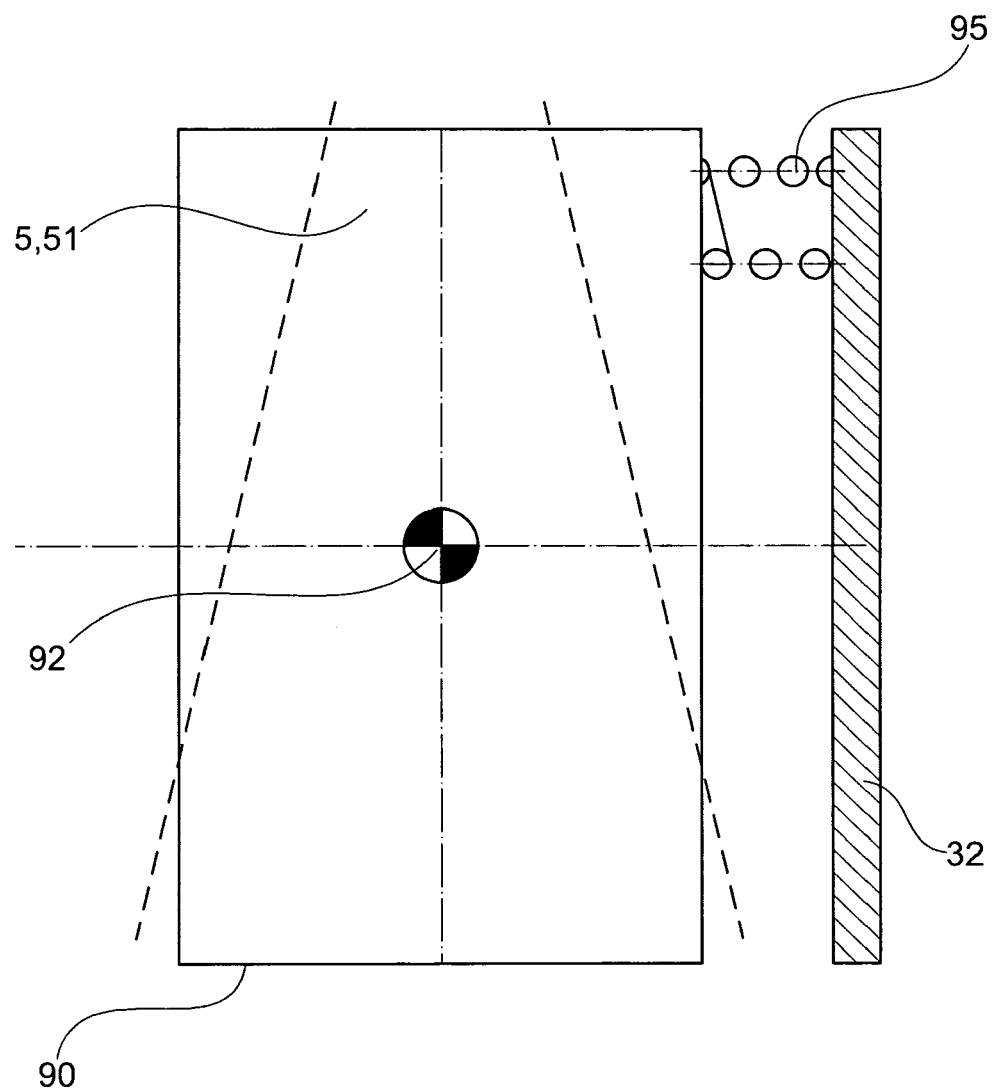
Figure 30:
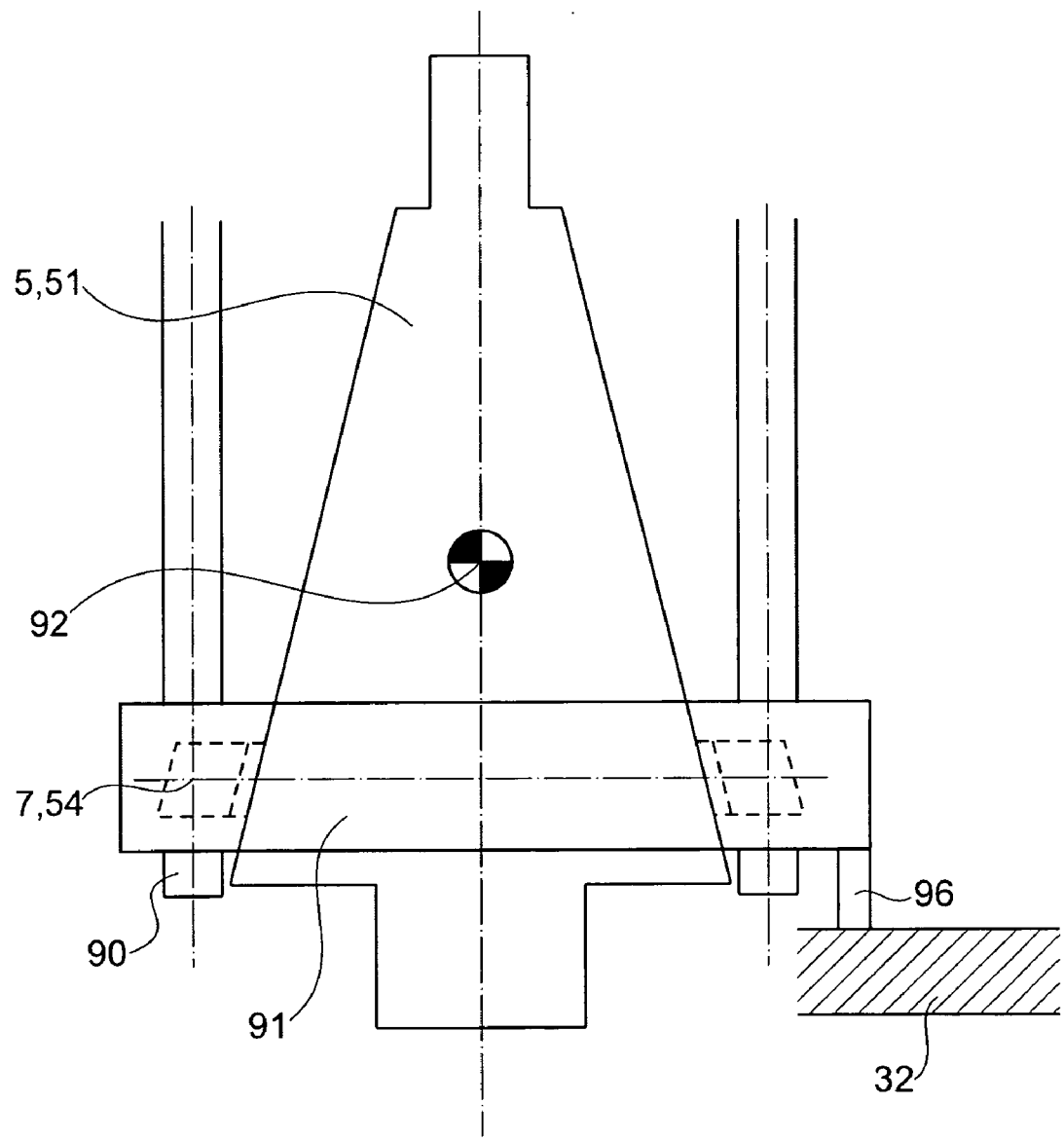
Figure 31:
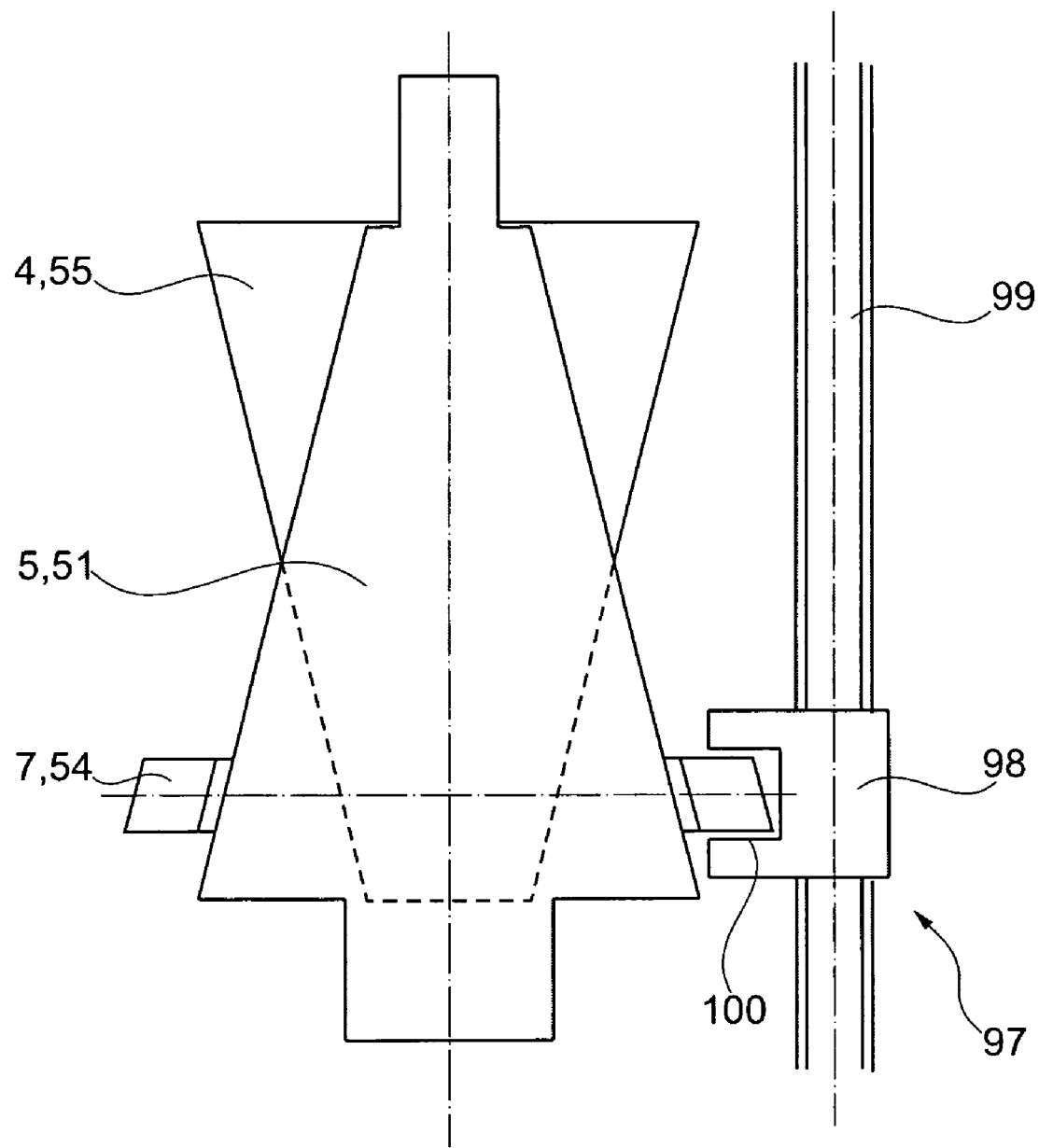

FIG. 29 schematically shows pre-tensioning of the actuating bridge in FIGS. 1 and 28;

FIG. 30 schematically shows an end stop for the holding device in FIGS. 28 and 29; and FIG. 31 shows an alternative embodiment for the holding device shown in FIGS. 28 to 30.

Figure 2:
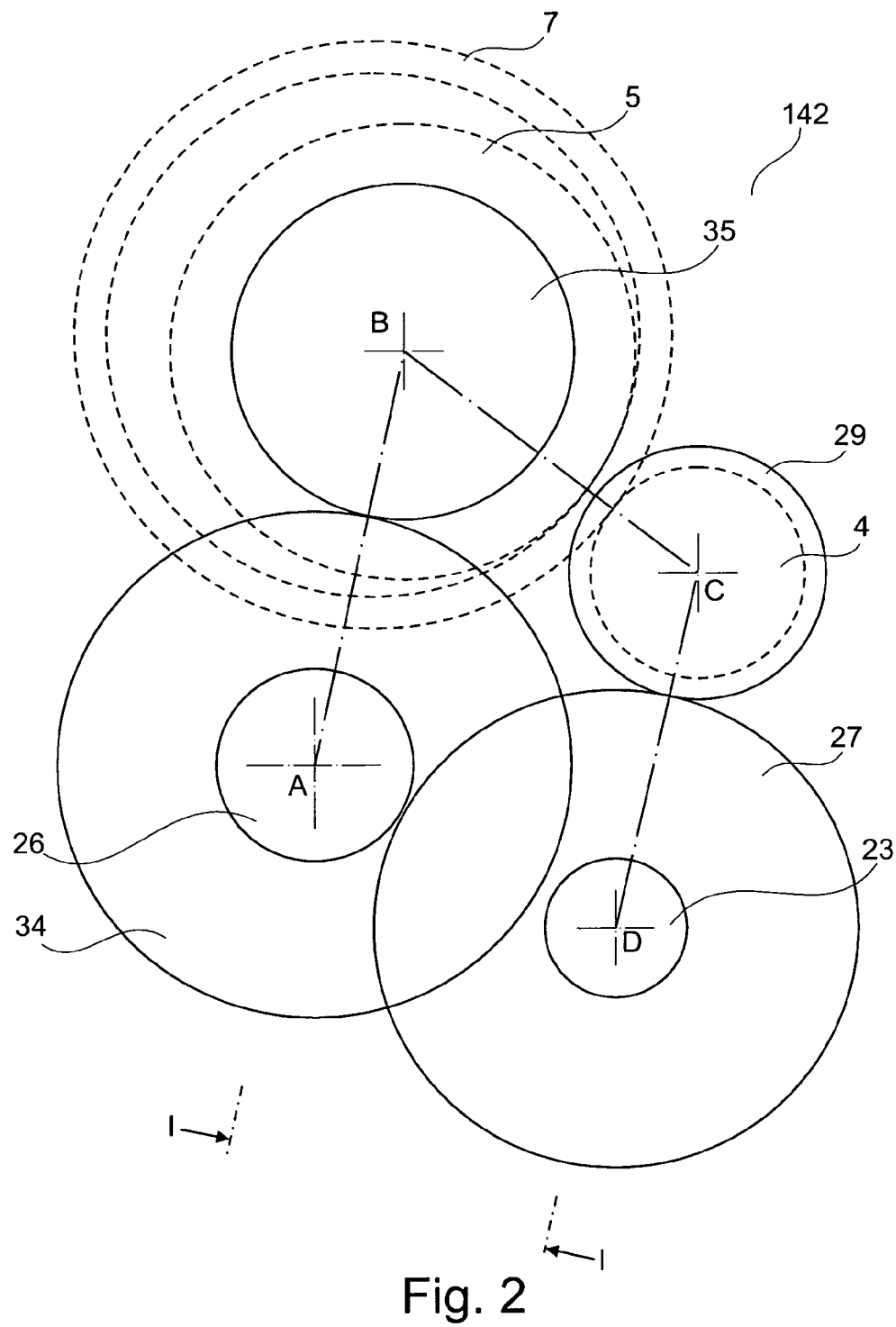
FIG. 2 shows the transmission in FIG. 1 in a schematic side view.
Figure 3:
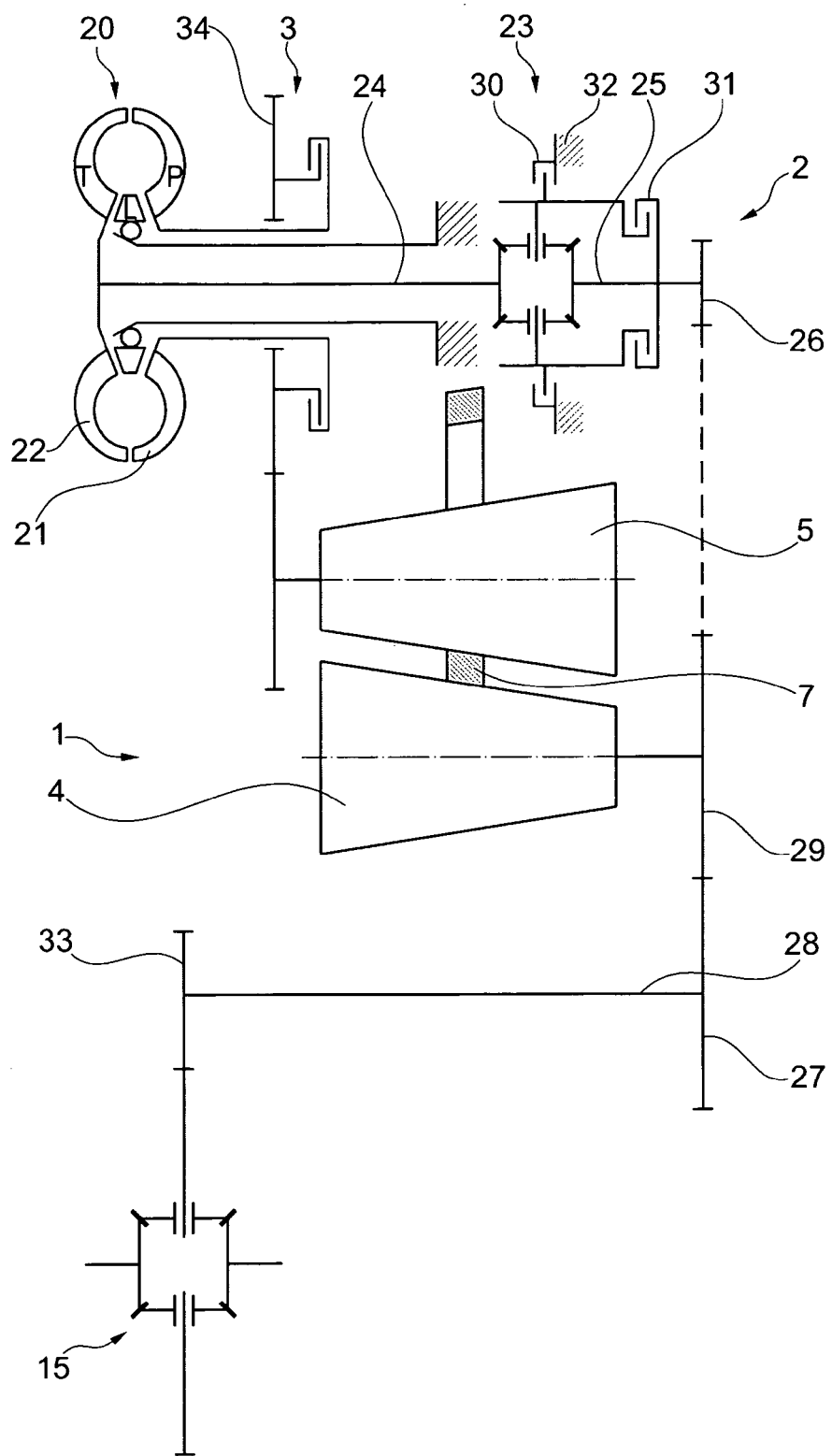
FIG. 3 shows a schematic illustration of the transmission in FIG. 1.

The transmission illustrated in FIGS. 1 through 3 to essentially comprises two transmission stages 1, 2, which may be switched alternately into a drivetrain via a synchronized switching gear 3.

In this case, the first transmission stage 1 has a conical friction ring transmission having two cones 4, 5, situated opposing in such a way that a gap 6 remains between the cones 4, 5, in which a friction ring 7 runs while enclosing the cone 5. So that this conical friction ring transmission may transmit torques, the cone 4 includes a pressure device 8, which braces the two cones 4 and 5 between bracing bearings 9, 10 while applying a variable pressure.

Figure 4:
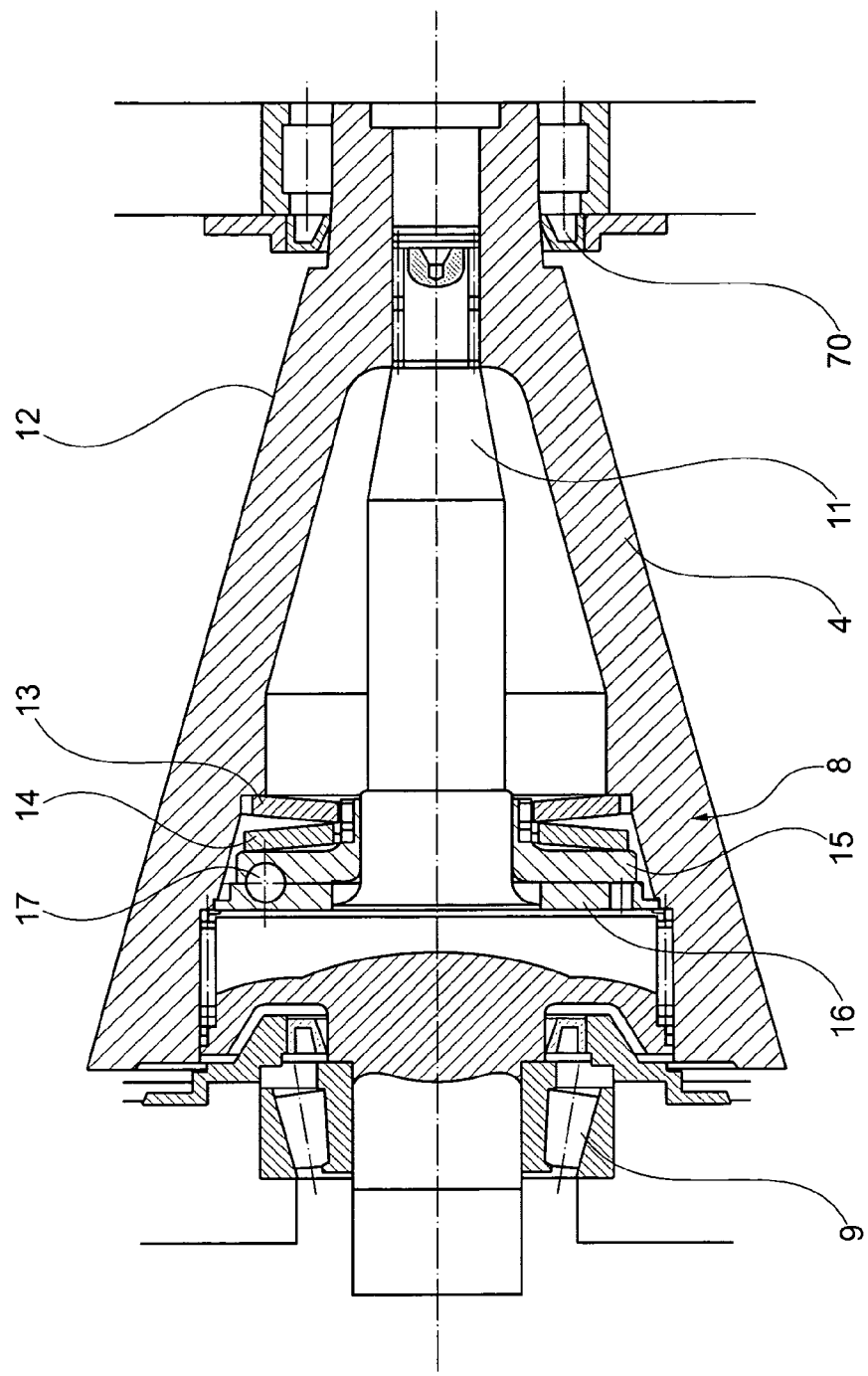
FIG. 4 shows an enlarged illustration of an output cone.
Figure 5:
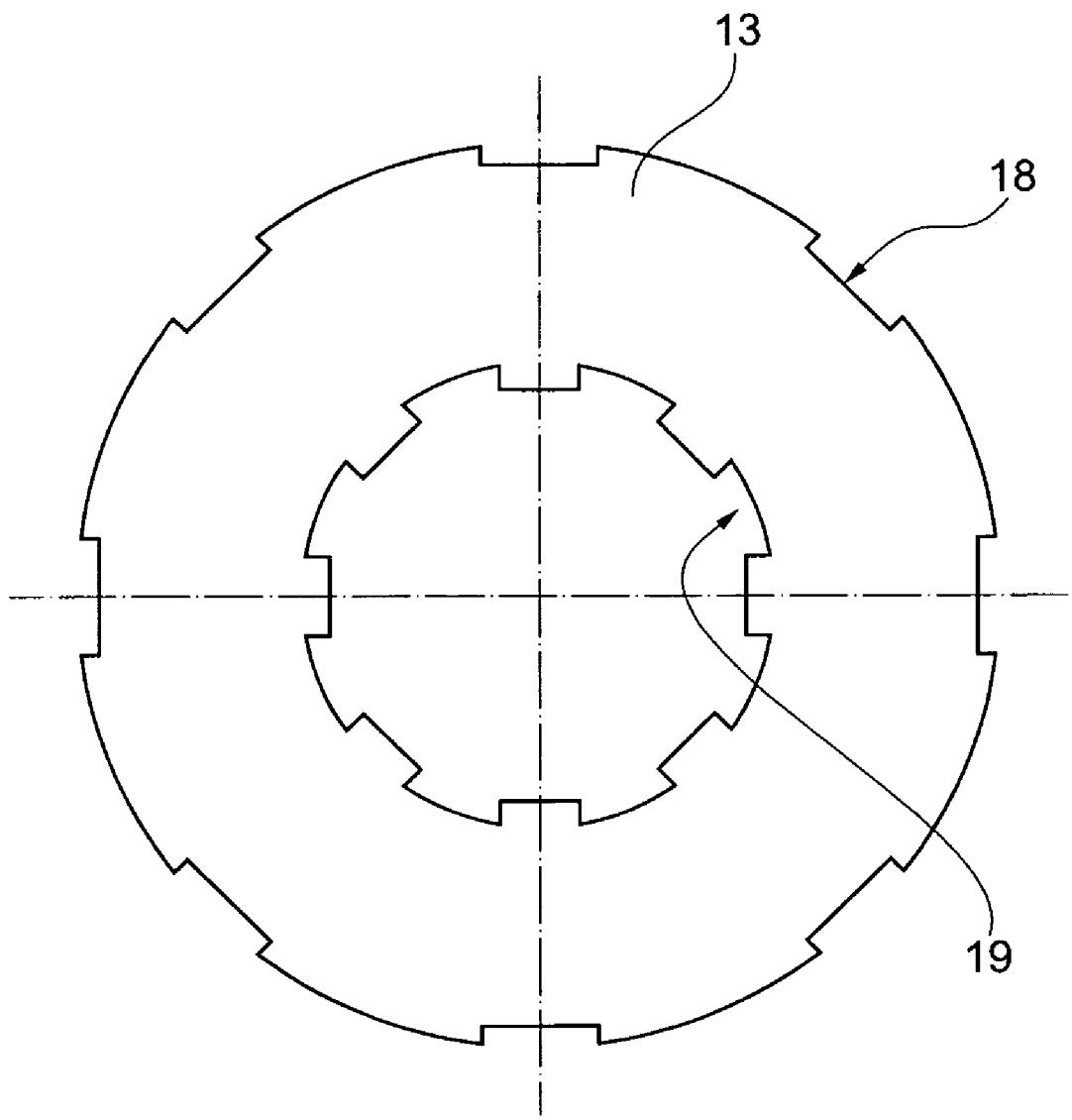
FIG. 5 shows a top view of the spring element of a pressure device of the transmission in FIGS. 1 through 4.

As is particularly obvious from FIGS. 1 and 4, the cone 4 has a running surface 12 and, in addition, a bracing element 11, between which the pressure device 8 is active, the pressure device 8 able to displace the clamping element 11 axially in relation to the running surface 12, so that the bracing element 11 is supported on the bracing bearing 9 and, in addition, presses the running surface 12 against the friction ring 7, this pressure being countered by the second cone 4 and the complementary bracing bearing 10.

In detail, the pressure device 8 includes two disk springs 13, 14, as well as two pressure elements 15, 16 and two roller elements 17 positioned between the pressure elements. As is immediately obvious from FIG. 2, the disk springs 13, 14 and the pressure elements 15, 16 are positioned in series in regard to the pressure, so that a significantly larger movement play than that in the related art remains to the pressure elements 15 in the event of a torque change, which leads to more precise and reproducible setting of the pressure. In addition, the disk spring 13 has radial recesses 18, 19, which engage in corresponding projections of the assembly having the running surface 12 and/or the pressure element 15. In this way, the disk spring 13 transmits torque between the assembly having the running surface 12 and the pressure element 15, through which the pressure element 15 is unloaded from a torque-loaded sliding movement in relation to the assembly comprising the running surface 15, which in turn leads to higher reproducibility of the resulting torque-dependent pressure. The rolling bodies 17 run in paths of the particular pressure element 15, 16, which have a changeable depth, in this exemplary embodiment. In this way, a torque-dependent distance between the pressure elements may be implemented, the rolling bodies 17 ensuring high reproducibility of the resulting pressure when the pressure elements 15, 16 are displaced around the circumference by the occurrence of torque. It is obvious that the above-mentioned features may advantageously ensure reproducibility of the resulting pressure independently of one another.

In addition, it is obvious that instead of the balls 17, other rolling bodies, such as rollers and/or rolling bodies fixed stationary on the pressure element, may be used. Furthermore, it is also conceivable to provide a pressure device of this type in the driving cone 5.

Instead of the mechanical arrangement, however, in an alternative embodiment a motorized actuator may also be provided for the pressure device, which, like hydrodynamic or hydrostatic axial bearings, is activated on the basis of measured torque in order to implement a torque-dependent pressure.

In addition, it is obvious that only displacement of the pressure elements 15, 16, and/or displacement of the component comprising the running surface 12 and the bracing element 11 occurring around the circumference or, for example, an axial force on the bracing bearings 9, 10 may be used to determine the torque occurring.

The exemplary embodiment shown in FIGS. 1 through 5 additionally includes a startup clutch, which is implemented as a Trilok converter, on the drive side in relation to the continuously variable conical friction ring transmission 2. For this purpose, the transmission stage comprising the conical friction ring transmission 1 is connectable via the switching gear 3, and/or a drive gearwheel 35 and a synchronized gearwheel 34, directly to the pump wheel 21 of the Trilok converter 20, startup able to be performed via the turbine wheel 22 of the Trilok converter and via a differential gear part 23. A differential side 24 of the latter differential gear part 23 is rigidly connected to the turbine wheel 22, while the second differential side 25 is used from output of this transmission stage and is connected via a gearwheel 26 and to the gearwheel 27 of a main output shaft 28, comprising an output pinion 33, of the overall transmission, the gearwheel 27 also engaging with the output 29 of the conical friction ring partial transmission 1. The output pinion 33 may, or example, engage with the main differential of a motor vehicle. The differential gear part 23 comprises two friction clutches 30, 31, which may alternately fix the main input of the differential gear cart 23 on the housing 32 or on the output 25. In this way, as is immediately obvious, the rotational direction of the output may be changed, through which, without anything further, a forward and a reverse gear may be implemented. When clutches 30, 31 are open, the differential and the turbine wheel 22 also freewheel, so that the conical friction ring transmission may be used in spite of the coupling of the outputs.

This arrangement has the advantage that for startup and/or in the reverse gear, the advantages of the Trilok converter 20 may be used. In addition, forward and reverse gears are implemented in an extremely compact way by the differential 23. In addition, through the switch 3, the disadvantage of the Trilok converter 20, causing large output losses and an excess torque increase through slip in normal operation, may be avoided, since the turbine wheel 22 may be short-circuited by the switch 3 and the conical friction ring partial transmission 1 is driven directly via the pump wheel 21. The output-side coupling of the two transmission stages 1 and 2 additionally allows the conical friction ring partial transmission 1 to be set in regard to its transmission ratio before a switching procedure between these two transmission stages 1 and 2 in such a way that the two transmission stages 1 and 2 are also nearly synchronized on the input side. The remaining synchronization may be performed by the switching gear 3 itself, the Trilok converter 20 also able to act as a support.

Figure 6:
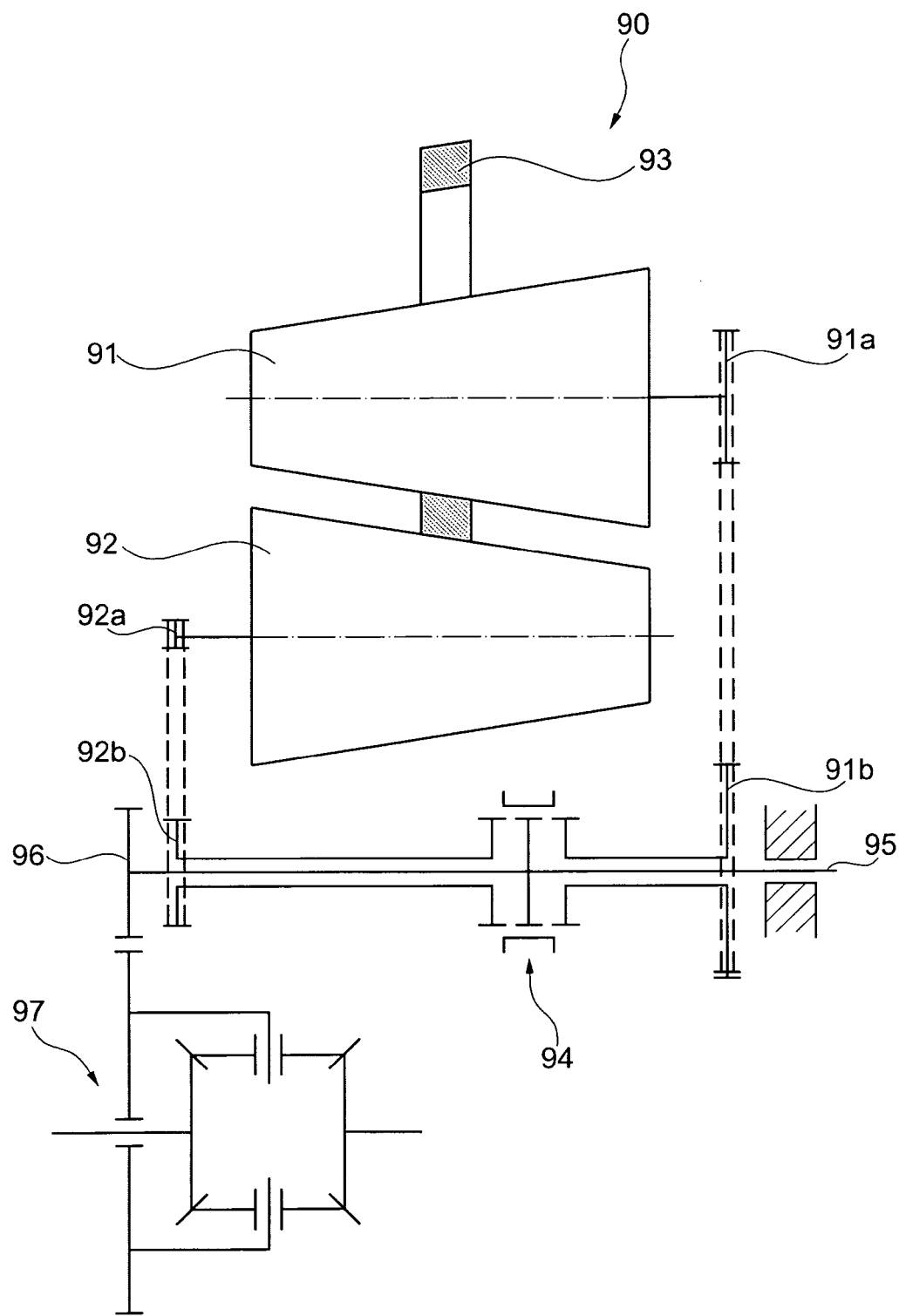
FIG. 6 shows a schematic illustration of a further transmission.

In the transmission arrangement shown in FIG. 6, two revolving, opposing coaxially positioned cones 91, 92 are also mechanically connected to one another via a friction ring 93, which may be displaced along a gap remaining between the mantel surfaces of the cones 91, 92, so that different transmission ratios may be implemented. In this arrangement, both the drive cone 91 and the output cone 92 are switchable via a synchronization 94 onto a main output shaft 95, which in turn engages via a pinion 96 with the main differential 97 of a motor vehicle. In this arrangement, the drive cone 91 and the output cone 92 are connected to the main output shaft 95 with an identical number of rotational direction reversals, so that a rotational direction reversal may be ensured immediately by the synchronization 94. This arrangement allows a forward and reverse gear to be implemented with the most minimal number of assemblies, and therefore in an extremely cost-effective way. A rotational direction reversal may alternately be caused in this case between only one of the cones 91, 92 and the synchronization 94 by engaging gearwheels or revolving belts, so that a first gear or an overdrive may also be represented cost-effectively through this arrangement if necessary. Depending on the rotational direction of the drive, the pinions 91*a* and/or 92*a* and the wheels 91*b* and 92*b* may be connected via a belt arrangement or may engage directly. In addition, it is conceivable to provide a gearwheel which reverses rotational direction between the pinion 96 and the main differential 97.

The synchronization is preferably provided with a rest setting and/or a middle position, so that the cones 91, 92 may freewheel. In this way, the friction ring 93 and/or another coupling element may be adjusted even when the vehicle is stopped.

The arrangement shown in FIG. 6 particularly uses the rotational direction reversal of the conical friction ring transmission in order to provide a forward and reverse gear in a cost-effective way. It is thus also suitable for all other continuously variable transmissions which reverse the rotational direction.

In addition, the arrangement shown in FIG. 6, like the arrangement in FIGS. 1 through 5, has a transmission element on both the output and the drive sides, using which the torque may be conducted around the conical friction ring transmission 91, 92, 93.

Figure 7:
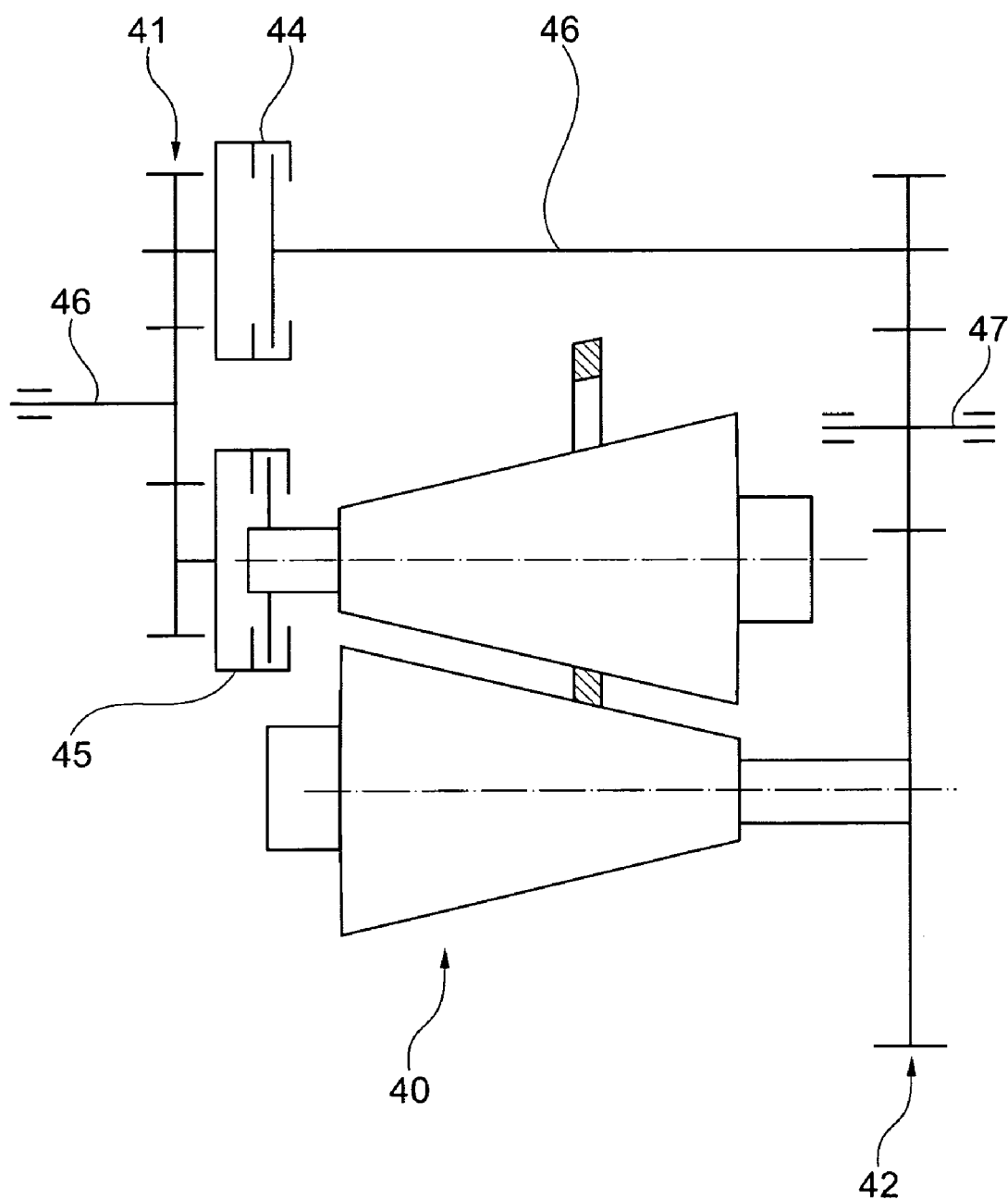
FIG. 7 shows a schematic illustration of a further transmission.

The drivetrain shown in FIG. 7 also comprises a conical friction ring transmission 40 as a continuously variable partial transmission, which, as in the exemplary embodiment shown in FIGS. 1 through 5, is assigned a power divider 41 on the drive side and a power divider 42 on the output side. In this case, a first gear 43 is connected in parallel to the conical friction ring transmission 40 via the power dividers 41 and 42, these being synchronized on the drive side, as already described, and able to be switched alternately into the drivetrain between drive 46 and output 47 via friction clutches 44, 45.

Figure 8:
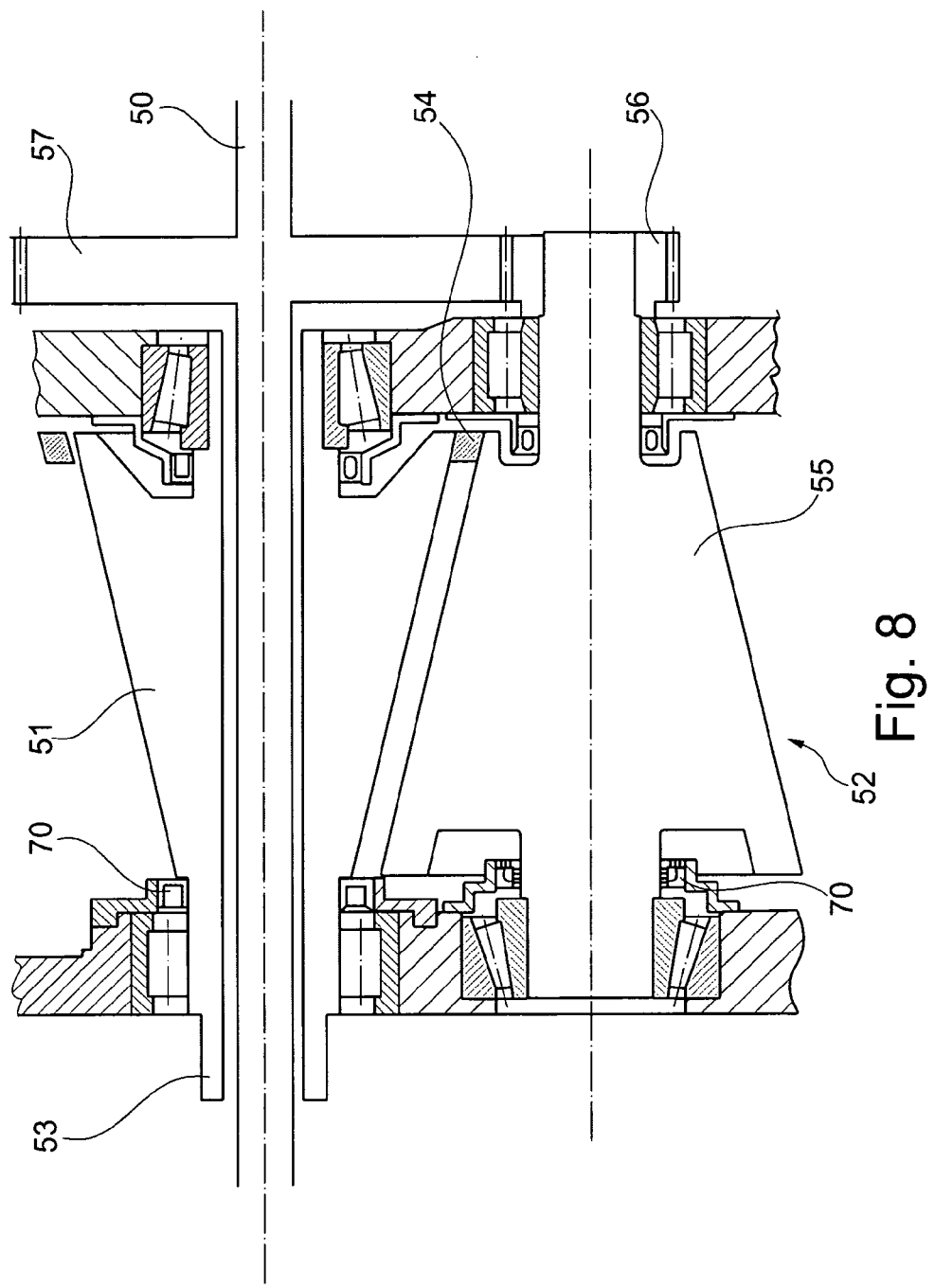
FIG. 8 shows a schematic illustration of a further possible transmission having coaxial drive and output.

The exemplary embodiment shown in FIG. 8 shows a coaxial arrangement of drive and output, which advantageously implements a coaxial output on both sides in a continuous transmission, particularly in a conical friction ring transmission. This leads to relatively low housing loads and, in addition, is built extremely compactly, an output shaft 50 preferably—particularly in this exemplary embodiment—penetrating the drive cone 51 of a conical friction ring transmission 52. This arrangement is also advantageous in other types of continuous transmissions, particularly in combination with electric motors, the output shaft also able to penetrate through the armature shaft of the electric motor in the latter case.

A motor (not shown) thus drives, via a drive 53, the driving cone 51 in this exemplary embodiment, which in turn acts on an output cone 55. This cone is mechanically connected via a pinion 56 to an output wheel 57, which is seated on the output shaft 50.

Figure 9:
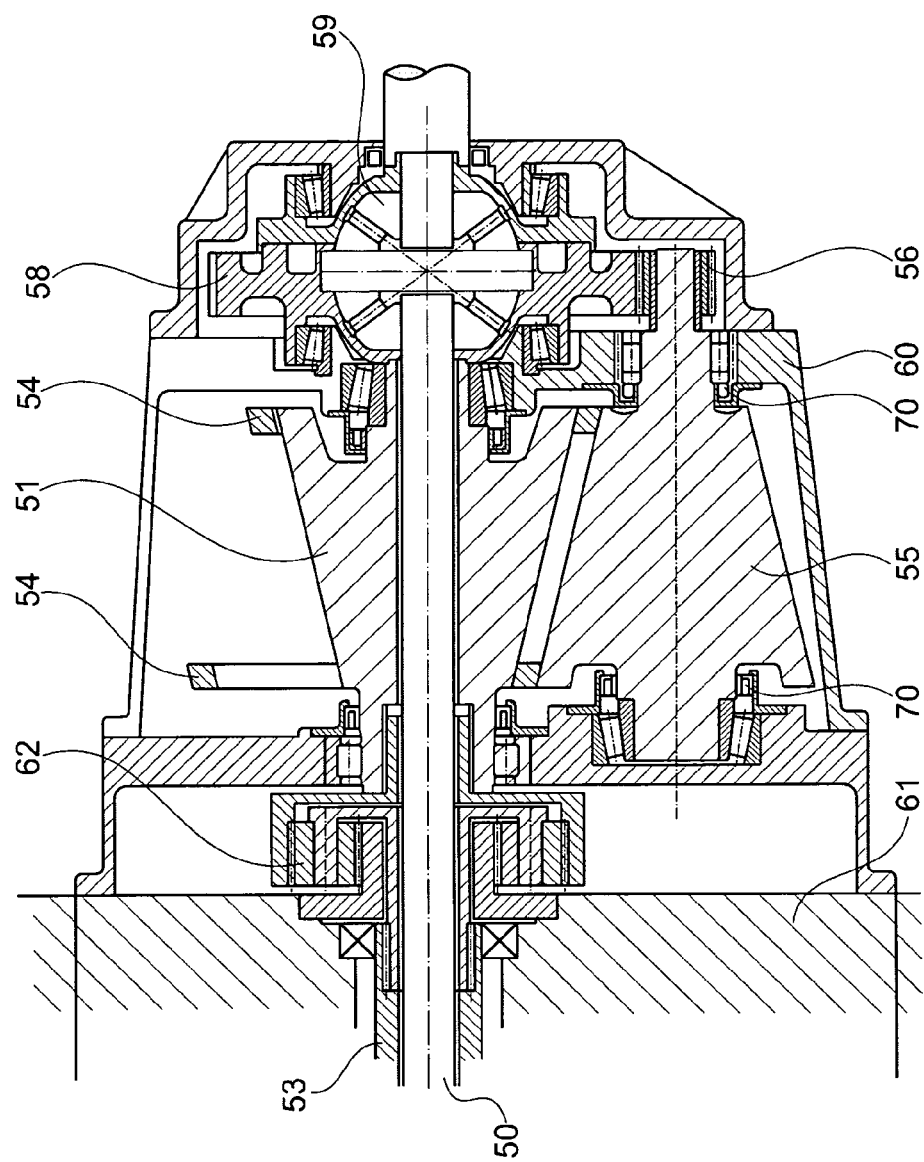
FIG. 9 shows a schematic illustration of an alternative further transmission having coaxial drive and output, a fraction ring being shown in two operating positions.

The transmission shown in FIG. 9, whose housing 60 is placed on a housing 61 of an electric motor, has a similar construction. In this exemplary embodiment as well, the armature shaft 3 is implemented as hollow and is penetrated by the output shaft 50. The output pinion 56, however, engages with a drive wheel 58 of a differential 59, which is in turn connected to the two-part drive shaft 50. Since a gearwheel must be provided at this point anyway, this arrangement is built extremely compactly.

In addition, this arrangement has a planetary gear 62 for torque reduction as a supplement between the motor and continuous transmission, so that the continuously variable transmission is not overloaded.

Figure 10:
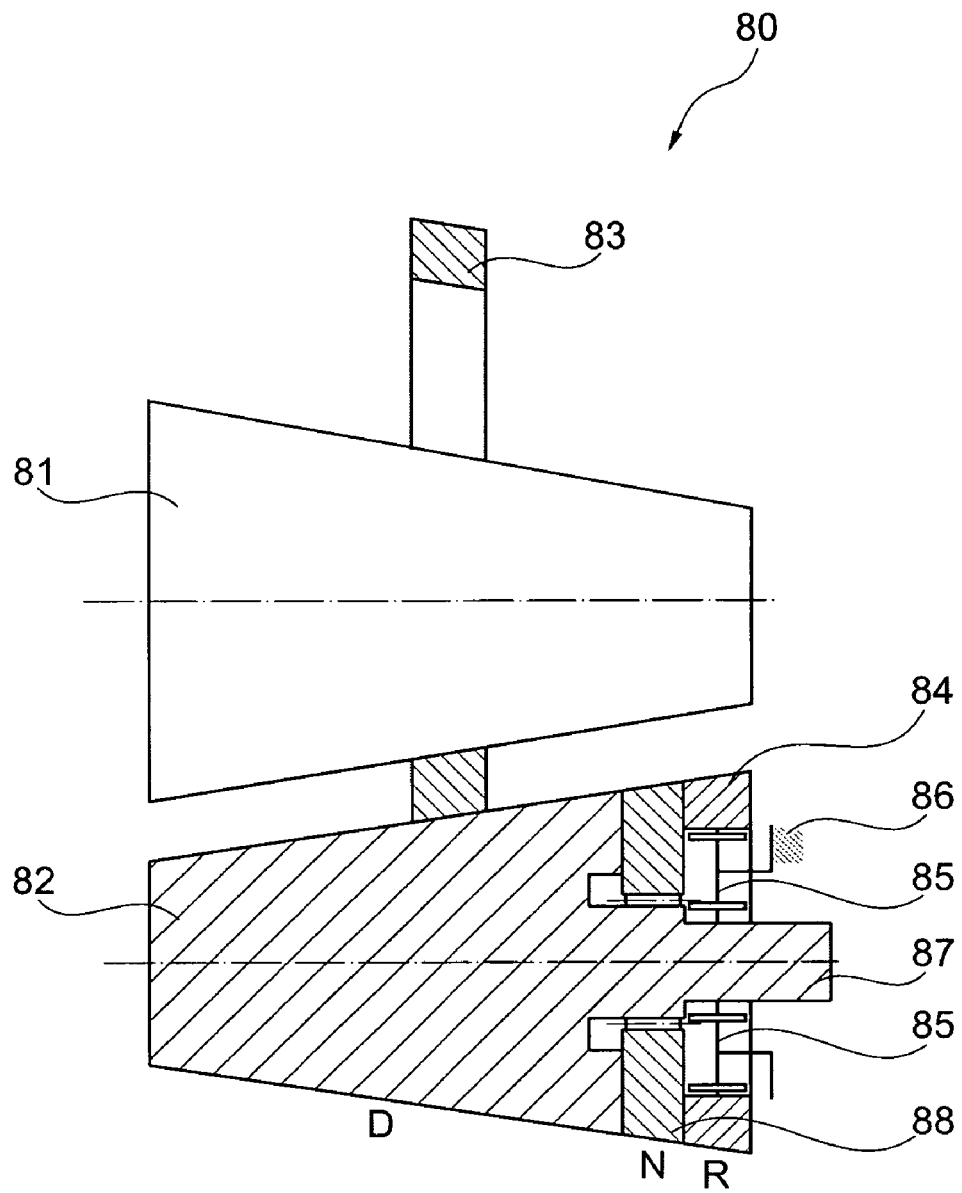
FIG. 10 shows a possible reverse gear in a transmission according to the present invention.

The conical friction ring arrangement 80 shown in FIG. 10 may particularly be applied in combination with the arrangements in FIGS. 7, 8, and 9 and implement a reverse gear extremely compactly, this transmission 80 including two cones 81 and 82, which interact with one another via a ring 83. The cone 82 has, in addition to a normal cone region (D), a region (R) revolving in the opposite direction, which is implemented in this exemplary embodiment by a conical ring 84 which revolves around planet wheels 85, which are in turn mounted fixed in the transmission housing 86 and whose insides roll on a conical shaft 87 of the cone 82. In this way, the conical ring 84 rotates opposite to the remaining part of the cone 82. In addition, the cone 82 has a neutral region (N), which includes a ring 88, which is in turn mounted on the cone shaft 87 so it rotates freely.

In this arrangement, the friction ring 83 may first be displaced from the main region (D) of the one 82 into the neutral region (N), the conical ring 88 adapting itself to the rotation preset by the main cone 82 and the friction ring 83. If the friction ring 33 is displaced further in the direction toward the reverse region (R), it leaves the main region (D), so that the rotational direction of the neutral region (N) may adapt to the rotational direction of the reverse ring 84. In this way, a reverse gear is implemented extremely compactly.

A reverse gear 80 of this type, and/or even an arrangement for rotational direction reversal implemented in a known way, may particularly be advantageous with the exemplary embodiment shown in FIG. 7, since in this way, if the power and/or speed dividers and/or adders 41 or 42 are switched suitably and the transmission ratios are selected suitably, stoppage of the output shaft 47 may be implemented, even though the conical friction ring transmission 40 and the shaft 43 rotate. In this way, all driving situations may be implemented in a vehicle, i.e., reverse travel, forward travel, and stoppage, without transitions and without further clutches, clutches or further transmission stages certainly still able to be provided for additional driving situations, such as full load or continuous load operation.

In the arrangement shown in FIGS. 11 through 18, which essentially corresponds to the arrangement in FIGS. 1 through 5, so that repeated explanations will be dispensed with, two transmission paths 101, 102 are provided, which may be switched alternately into a drivetrain via a synchronized switching gear 123 and/or a conical clutch 134. In this case, the first transmission path 101 again has a conical friction ring transmission having two cones 104, 105 positioned opposing in such a way that a gap 6 remains between the cones 104, 105, in which a friction ring 107 runs while enclosing the cone 105. In order that this conical friction ring transmission can transmit torques, the cone 104 comprises a pressure device 108, which braces the two cones 104 and 105 in a way known per se and/or described above between bracing bearings 109, 110 while applying a variable pressure. For this purpose, the pressure device has two rolling elements 117 and guide bodies 118 and 119, which are braced via disk springs 120 and via which, as will be explained in the following, a pressure which is a function of the torque is applied in that the pressure device 108 expands as a function of the torque and correspondingly supports itself against the bearings 109, 110.

Figure 11:
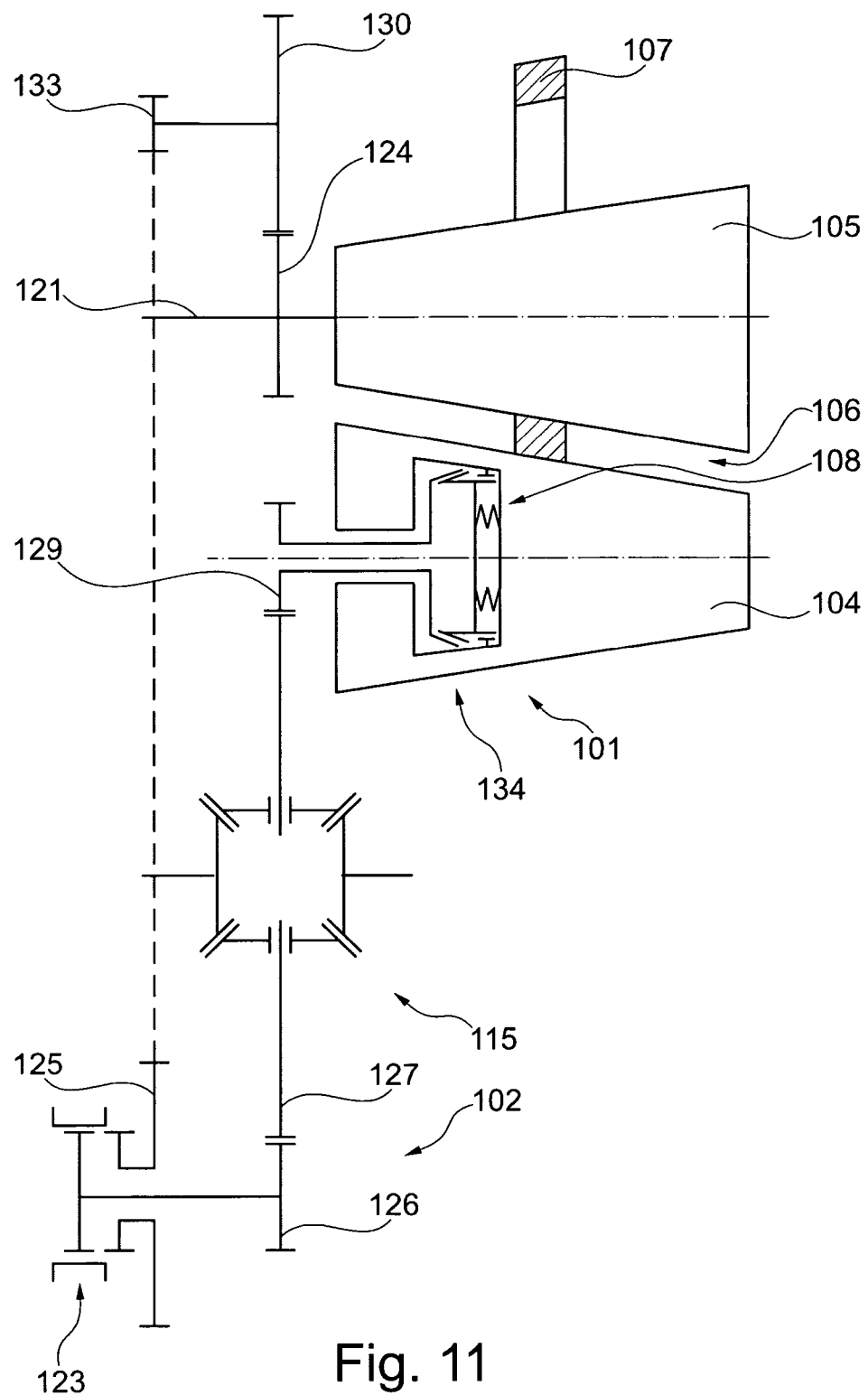
FIG. 11 shows a schematic illustration of a further transmission in a similar type of illustration as in FIG. 3.
Figure 12:
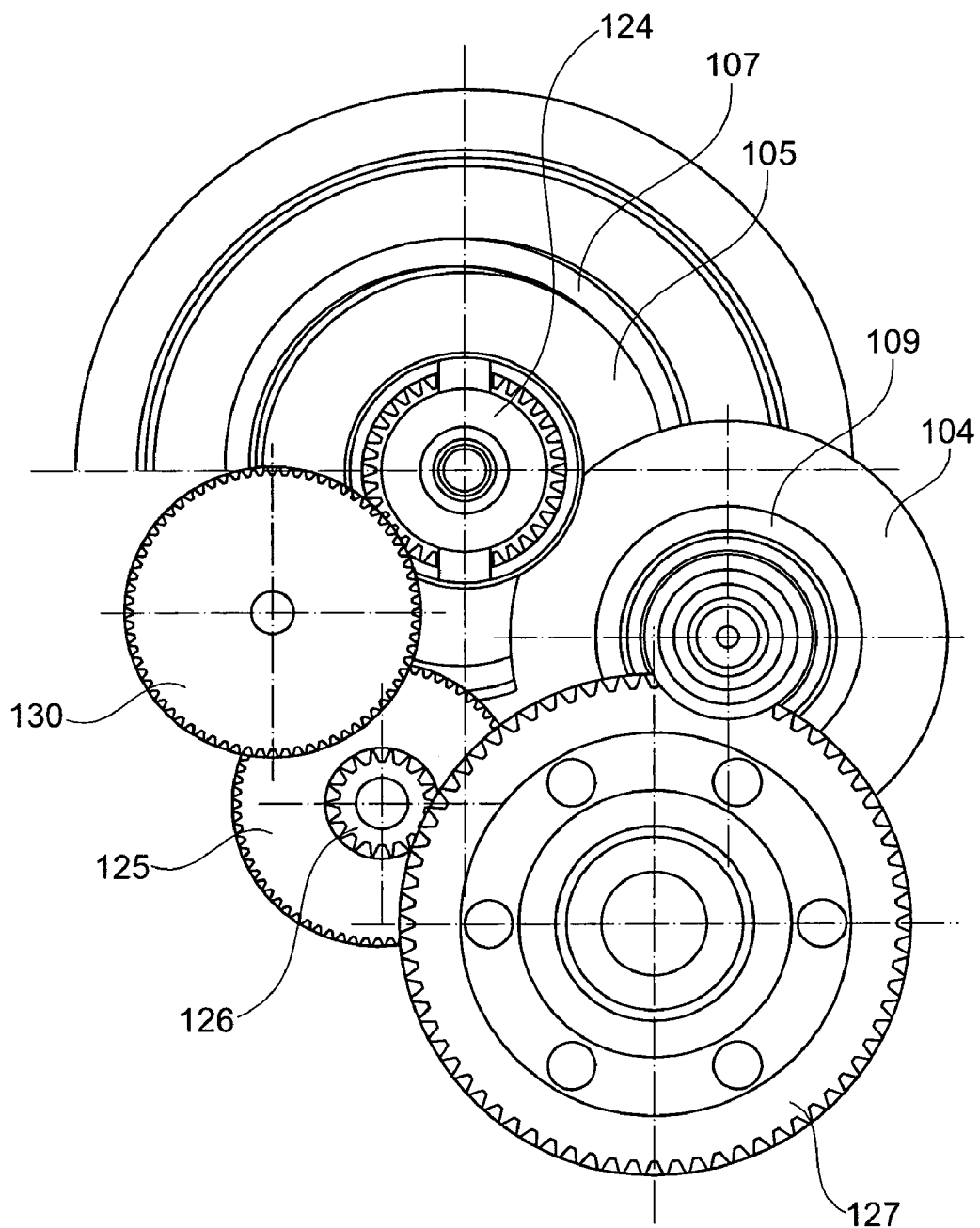
FIG. 12 shows the transmission in FIG. 11 in a section through the differential, the reverse gear, and the mounting of the output cone.
Figure 13:
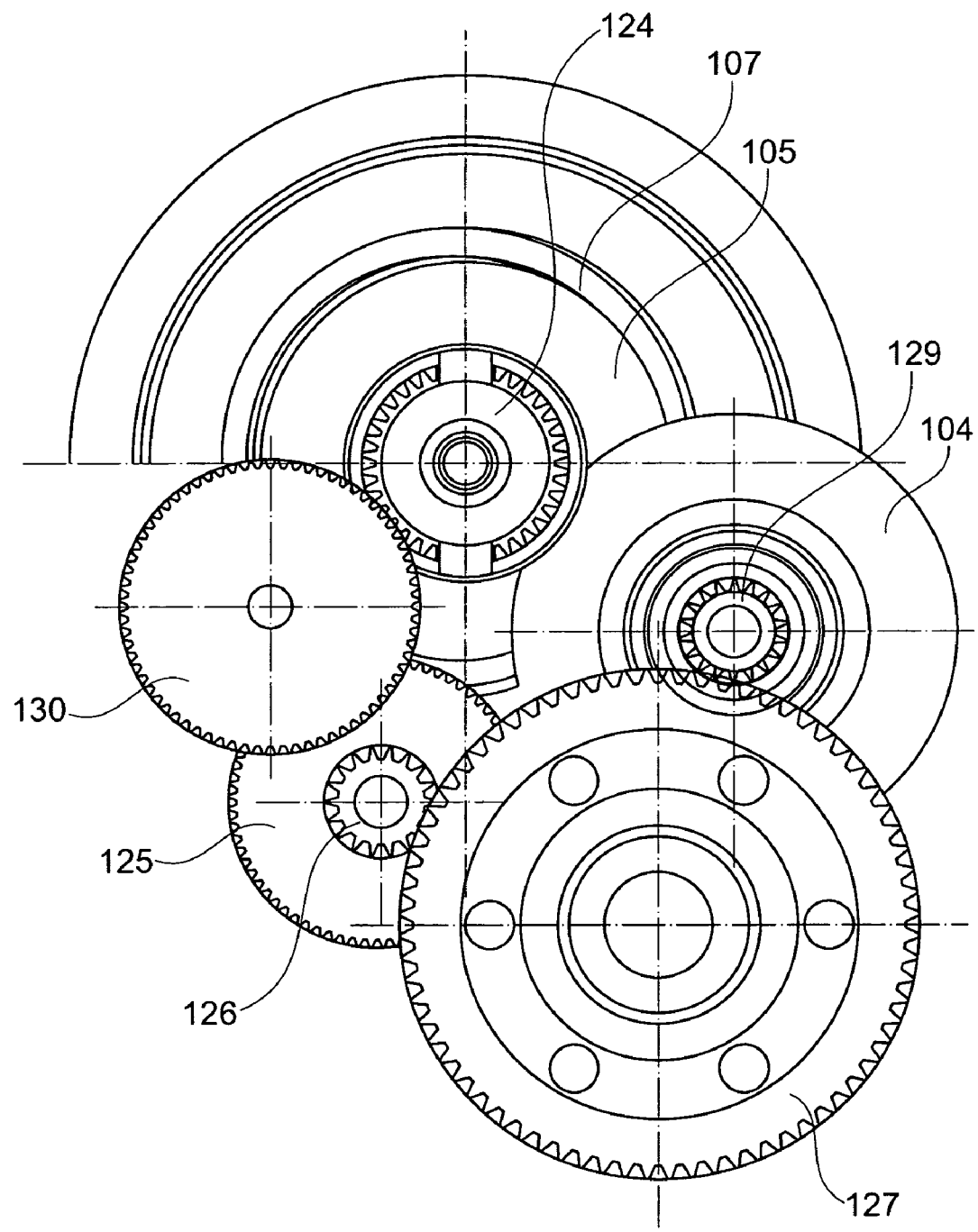
FIG. 13 shows the transmission in FIGS. 11 and 12 in a section through the differential, the reverse gear, and the output of the output cone.
Figure 14:
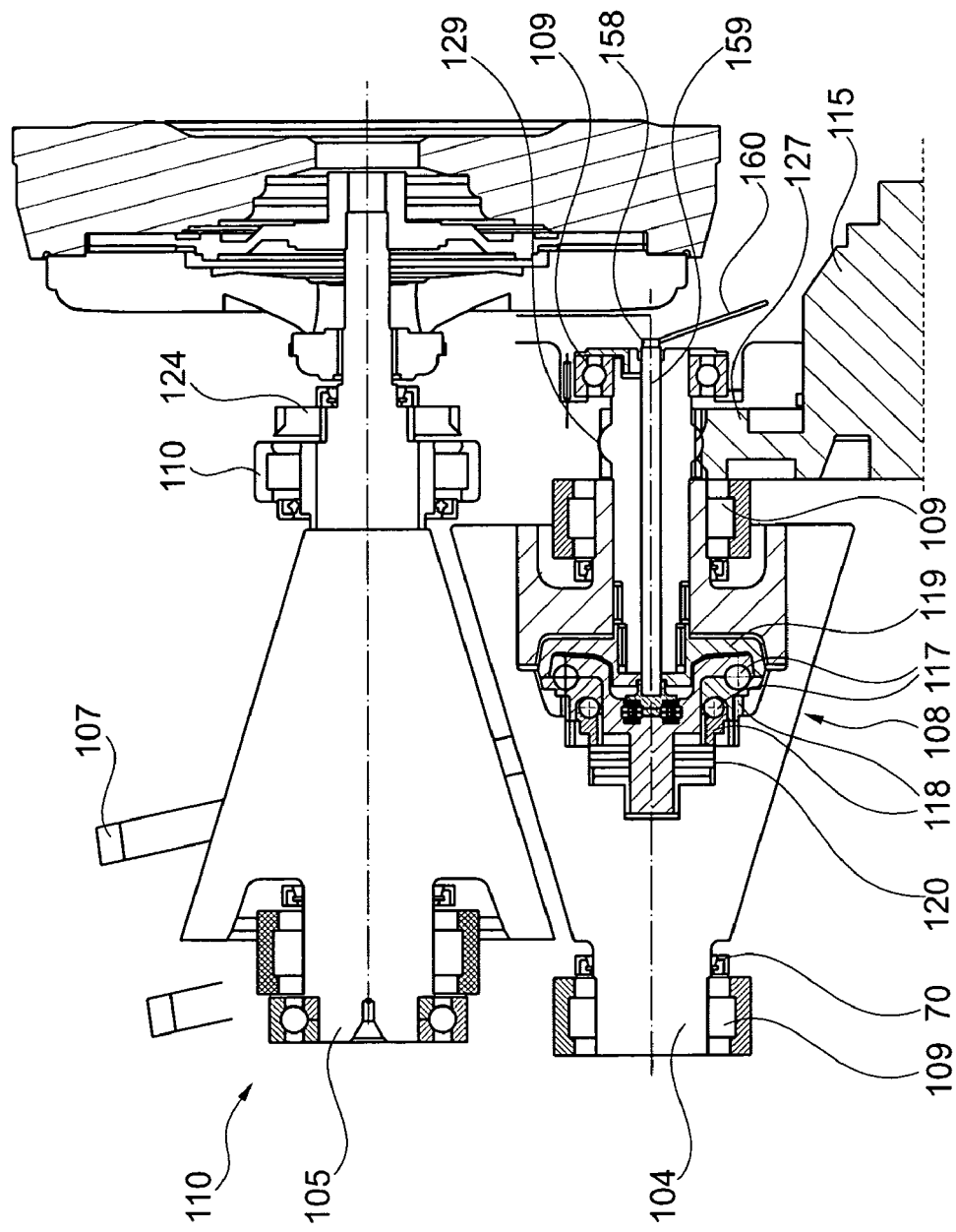
FIG. 14 shows the transmission in FIGS. 11 through 13 in a similar illustration as in FIG. 1.

As is particularly obvious from FIG. 11, the reverse gear includes a drive wheel 124, using which the transmission paths 102 is branched off from the main transmission path. A switching wheel 125 is driven via intermediate wheels 130 and 133, which may be coupled via the synchronized switching gear 123 to the pinion 126, which in turn engages directly with the external wheel 127 of the main differential 115. The overall arrangement is built extremely compactly and may be implemented even more compactly if the drive wheel 124 is connectable to the drive shaft 121 via a synchronized switching gear and engages directly with the external wheel 127.

In addition to this reverse gear 102, the arrangement includes a forward gear, which is implemented by the continuous transmission 101. The forward gear is coupled via the pinion 129 to the external wheel 127 and thus to the reverse gear 102 and may be engaged and disengaged via the clutch 134. As is immediately obvious, the particular transmission elements of the partial transmission paths 101 and 102 also freewheel in the disengaged state.

Figure 15:
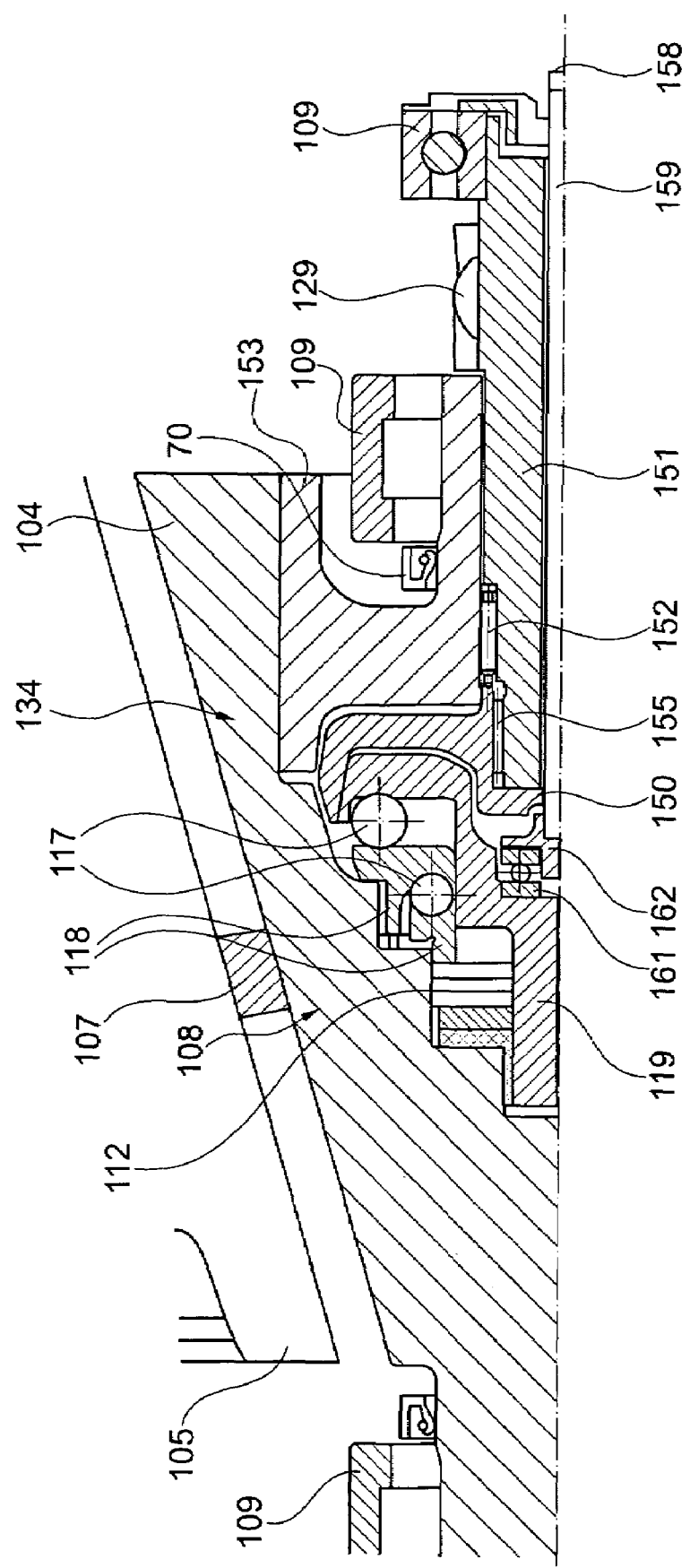
FIG. 15 shows a detail enlargement of the illustration in FIG. 14 with the pressure device expanded.
Figure 16:
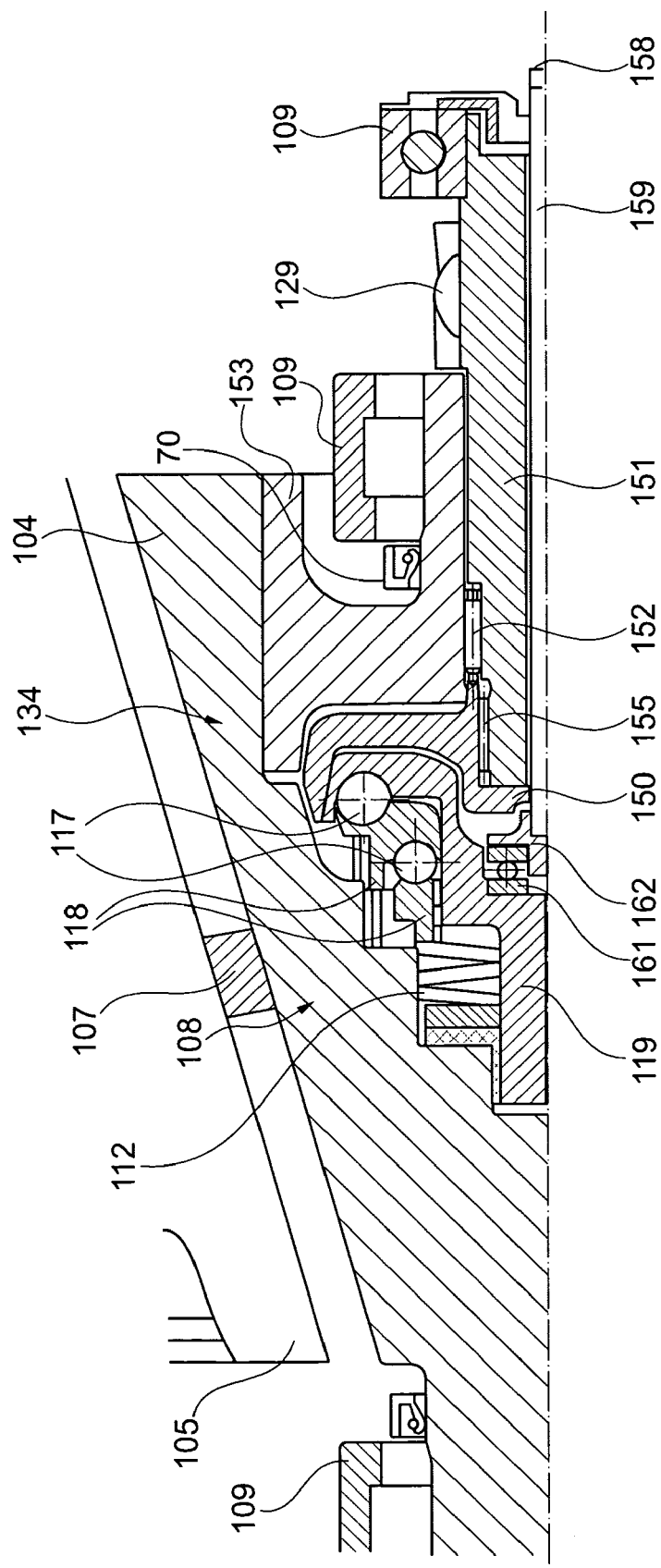
FIG. 16 shows the arrangement in FIG. 15 with the pressure device contracted.
Figure 18:
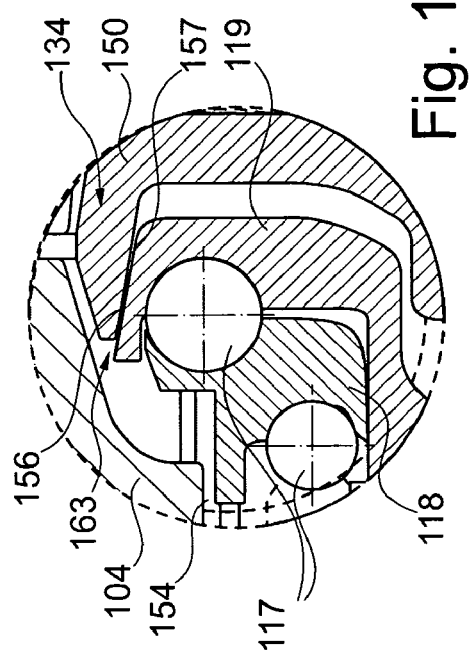
FIG. 18 shows the detail enlargement XVIII in FIG. 17.
Figure 17:
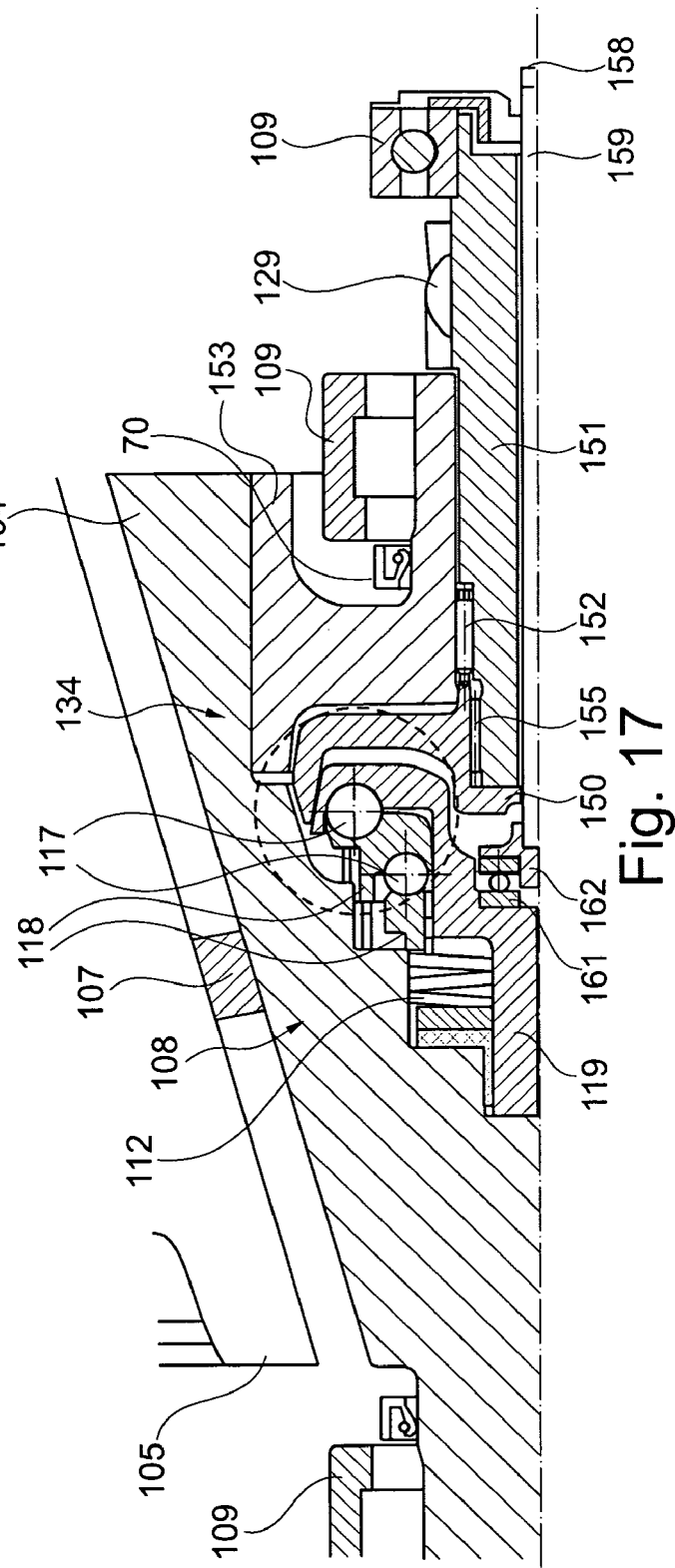
FIG. 17 shows the arrangement in FIGS. 15 and 16 with the cone clutch opened.

As already indicated above, the pressure device 108 works together with the clutch 134. The mode of operation may be seen most clearly on the basis or FIGS. 15 through 18. As shown in FIGS. 15 and 16, the pressure device 108 may expand as a function of the transmitted torque. In this case, FIG. 15 shows the arrangement at a high torque and therefore high pressures and FIG. 16 shows the arrangement at low pressures. The pressure is essentially generated as a function of the torque in that the support body 119 supports itself on the bracing bearings 109 via a counterpart 150 and via an output shaft 151. The output pinion 129 is also seated on the shaft 151. In addition, the shaft 151 is radially mounted on a centering body 153 via a needle bearing 152. Torque is transmitted to the output pinion 129 from the output cone 104 via teeth 154 (see FIG. 18) and 155.

In the pressure device 108, these torques cause a displacement of the cone 117, so that the pressure may be varied in the desired way, as is obvious in FIGS. 15 and 16. As is immediately obvious from FIGS. 15 through 18, the two bodies 119 and 150 press against one another via conical surfaces 156, 157 (see FIG. 18). Finally, the two conical surfaces 156, 157 form the active clutch 134, which is closed by the pressure device 108. To open the clutch 134, the overall arrangement has a cylinder 158 fixed on the housing, in which a piston 159 runs, which may have pressure applied to it via a hydraulic line 160. The piston 159 is mounted on the support body 119 via an axial bearing 161 and a support body 162. If the piston 159 has pressure applied to it, it unloads the body 150 of the clutch 134 from the pressure of the pressure device 108. As the clutch 134 opens, torque is no longer transmitted, so that the pressure device 108 relaxes, and only a very slight pressure must be applied in order to open the clutch 134 or keep it open. When clutch 134 is open, a gap 163 remains between the conical surfaces 156, 157, as may be seen in FIG. 18. It is obvious that instead of the piston 159 and the hydraulic line 160, other measures may also be provided, through which the body 119 may be unloaded and the clutch 134 may be opened. Any measure, using which the body 119 may be supported on the housing of the overall transmission while bypassing the clutch 134, is especially suitable.

The arrangement shown in FIGS. 15 through 18 is distinguished in particular in that the piston 159 does not also rotate, so that it may be sealed relatively cost-effectively.

The arrangement particularly has the advantage that no additional devices are necessary to close the clutch. In addition, the closing forces are a function of the torque transmitted and rise with it, since the pressure device is correspondingly equipped in this regard in any case.

Figure 19:
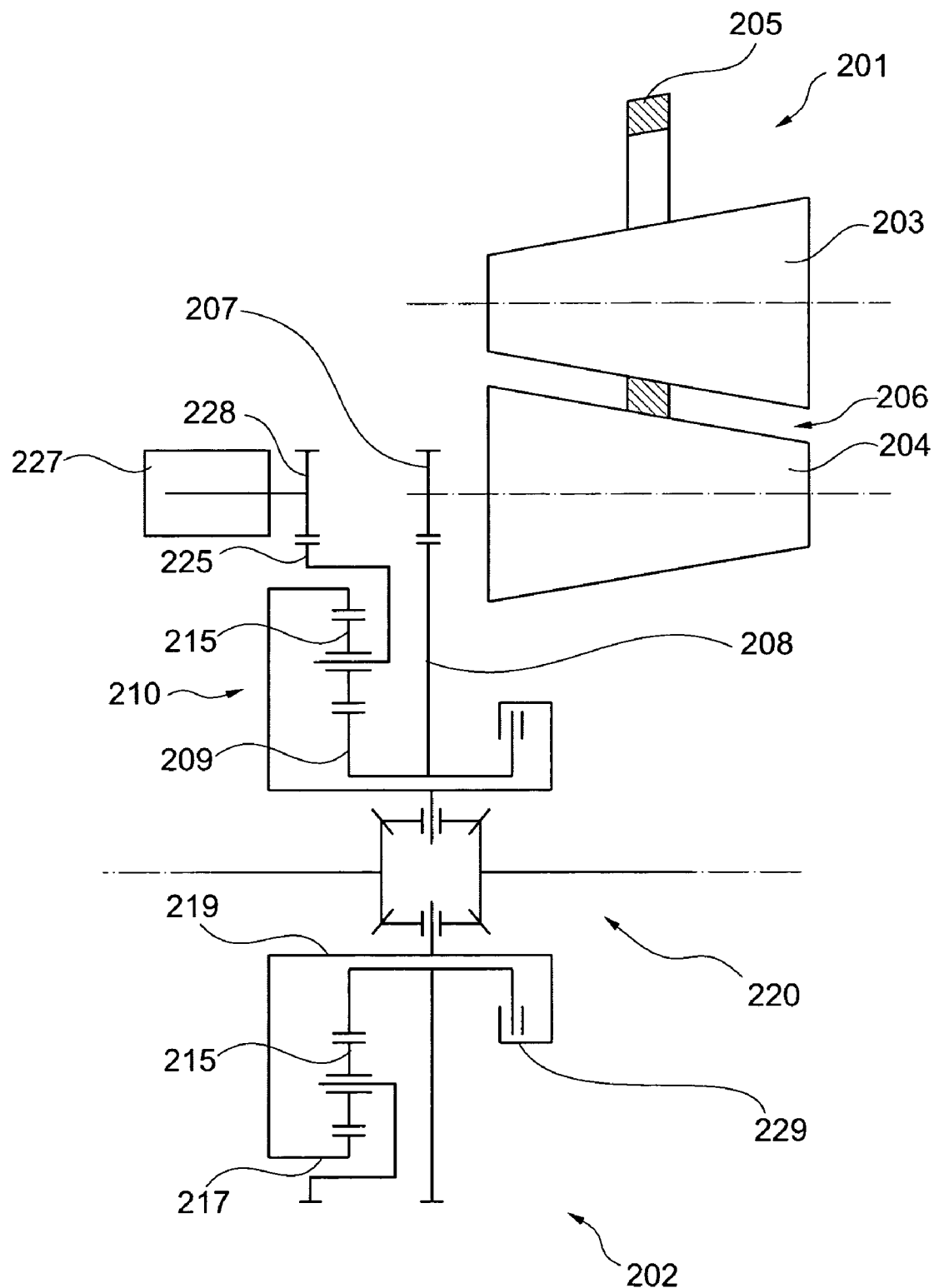
FIG. 19 shows a schematic illustration of a supplementary and/or alternative reverse gear.
Figure 20:
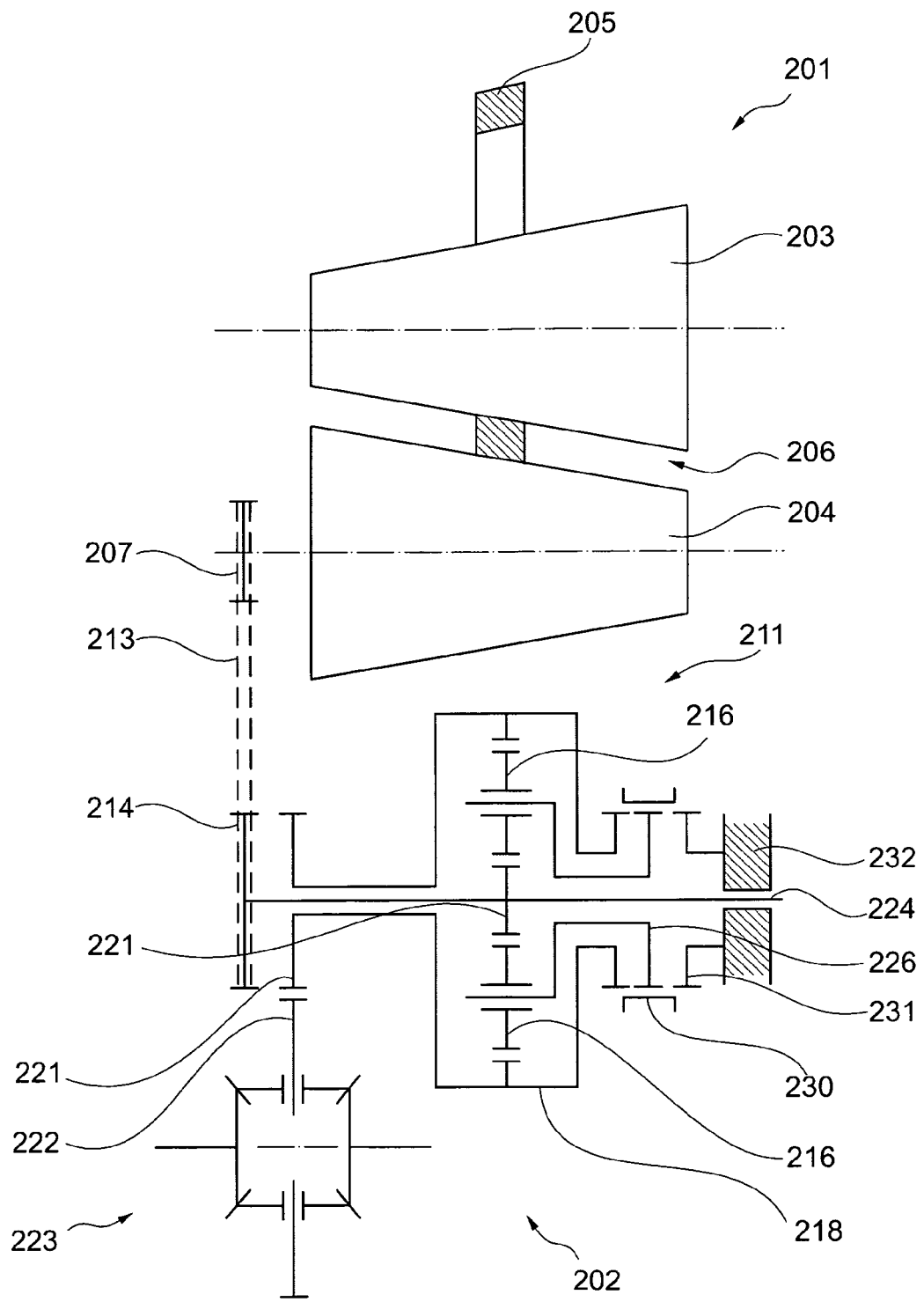
FIG. 20 shows a schematic illustration of a further supplementary and/or alternative reverse gear.

The arrangements shown in FIGS. 19 and 20 each comprise a conical friction ring transmission 201 and a reverse gear 202 connected in series therewith. In these exemplary embodiments, the conical friction ring transmissions 201 are constructed essentially identically and each have an input cone 203 and an output cone 204, which are positioned axially parallel and pointing toward one another and between which a friction ring 205 is displaceable in a gap 206, so that a variable transmission ratio may be set as a function of the position of the friction ring 205. The friction ring 205 encloses the drive cone 203 in these exemplary embodiments, while the output cone 204 carries an output pinion 207. It is obvious that the conical friction ring transmission may also be implemented differently, depending on the concrete embodiment.

In the exemplary embodiment in FIG. 19, the output pinion 207 engages directly with an assembly 208, which carries the sun wheel 209 of a planetary gear 210. The arrangement shown in FIG. 20 also comprises a planetary gear 211 having a sun wheel 212, which is driven by the output pinion 207. This is performed via a belt 213 and a wheel 214 which revolves with the sun wheel 212. All of the known belt and/or chain arrangements through which a sufficiently reliable force transmission may be ensured continuously may be used as the belt 213.

Both planetary gears 210 and 211 have planet wheels 215 and 216, respectively, which engage on one side with the particular sun wheel 209 and 212, respectively, and on the other side with a particular external wheel 217 and 218, respectively.

In the embodiment in FIG. 19, the external wheel 217 is connected directly to the revolving mount 219 of a differential 220. In this arrangement, the planetary gear 210 and therefore the reverse gear 202 thus lie directly on the differential 220. This arrangement has been shown to have an extremely compact construction and extremely high efficiency for this reason, since the number of transmission elements in the drivetrain is minimized. It is obvious that a reverse gear 202 positioned directly on the differential 220 is advantageous even independently of the remaining features of the present invention, because of the compact construction. Otherwise, an arrangement in which the output pinion 207 engages directly with an input wheel of a reverse gear and the output wheel of the reverse gear is connected directly to the revolving mount of the differential is advantageous for current motor vehicle engines because of the direction reversal caused by a conical friction ring transmission, since an arrangement of this type requires only a minimal number of transmission elements and therefore has an extremely high efficiency.

In contrast, in the embodiment in FIG. 20, the external wheel 218 is connected to an output wheel 221 and revolves with it, which in turn engages with the revolving mount of a differential 223. The direction reversal caused by this is compensated for by the belt arrangement 213, the reverse gear being positioned on and/or around an intermediate shaft 294 in the exemplary embodiment in FIG. 20. Arrangement on the intermediate shaft 224 has the advantage over the arrangement directly on the differential 220 suggested in FIG. 19 that the overall arrangement in FIG. 20 may have its spatial arrangement implemented more flexibly. This is advantageous in particular for environments in which the spatial relationships in direct proximity to the differential are limited by third assemblies. It is obvious that the arrangement of the reverse gear on an intermediate shaft 224—particularly also because of the rotational direction change caused by it—is advantageous even independently of the remaining features of the present invention. The latter is particularly true when conical friction ring transmissions are to be used in combination with foreign motors which have a contrary rotational direction. In cases of this type, the belt arrangement 213 may be dispensed with and the pinion 207 may engage with the collar 214. Furthermore, it may be advantageous if the output cone 204 is positioned directly on the shaft 224, so that a separate output pinion 207 and the belt arrangement 213 may be dispensed with entirely.

In addition, it is immediately obvious to one skilled in the art that the drive originating from the conical friction ring transmission 201 may also occur via the external wheels 217 and/or 218 and/or the other transmission elements of the reverse gear instead of via the sun wheels 209 and/or 212. The output of the reverse gear also does not have to occur via the external wheels 217 and/or 218. Rather, the sun wheels and/or other transmission elements may also be used for this purpose.

In order that the exemplary embodiments shown in FIGS. 19 and 20 may reliably maintain their states "forward" and/or "backward", fixing systems are provided in each case, using which a transmission element, in these exemplary embodiments a mount 225 and/or 226, on which the planet wheels 215 and/or 216 are mounted and which revolves with the planet wheels, may be fixed rigidly. Furthermore, fixing systems are provided which allow fixing of two transmission elements of the particular planetary gear 210 and/or 211 to one another. In this case, in the exemplary embodiment in FIG. 19 the sun wheel 209 and external wheel 217 are alternately fixed with one another, and in the exemplary embodiment in FIG. 20, the external wheel 218 and the revolving mount 226 of the planet wheels 216 are alternately fixed with one another.

Different fixing systems, such as clutches, slanted brakes, and/or synchronizations may be used to fix the transmission elements to the housing and/or to one another. Three of these are shown as examples in the exemplary embodiments shown, these able to be exchanged without anything further depending on the concrete requirements.

In the exemplary embodiment shown in FIG. 19, the mount 225 of the planet wheels 215 is fixed using an electromagnetic brake 227, which may alternately brake a braking pinion 228, which in turn engages with the mount 225 of the planet wheels 215. Therefore, if the rotational direction is to be changed in this arrangement, the brake is activated so that, in the degree to which the mount 225 is slowed in relation to the sun wheel 209 and the external wheel 217, the travel and/or speed of the output is reduced until it finally comes to a stop and then changes the direction.

External wheel 217 and sun wheel 209 are fixed via a brake 229, the planet wheels 215 also being fixed in relation to external wheel 217 and sun wheel 209 in this way. Since in this state the planetary gear 210 runs with extremely low losses, this state is preferably selected as the forward gear, it being immediately obvious that a brake corresponding to the brake 229 may also be provided, for example, between mount 225 and sun wheel 209 and/or external wheel 217. It may also suffice to merely prevent the planet wheels 215 from rotating in relation to the mount 225, in order to correspondingly stop the planetary gear 210 per se and allow it to revolve as a whole.

In the exemplary embodiment in FIG. 20, the alternate fixing is performed via a synchronization 230, using which the mount 226, which carries the planet wheels 216 and revolves with them, may be synchronized alternately with the external wheel 218 or in relation to a fixed wheel 231, which is fixed on the housing 232 in this exemplary embodiment. The mechanisms arising in this case correspond to the mechanisms as already explained in the exemplary embodiment in FIG. 19, it being obvious that the mount 226 may also be synchronized with the sun wheel 212 instead of with the external wheel 218.

Figure 21:
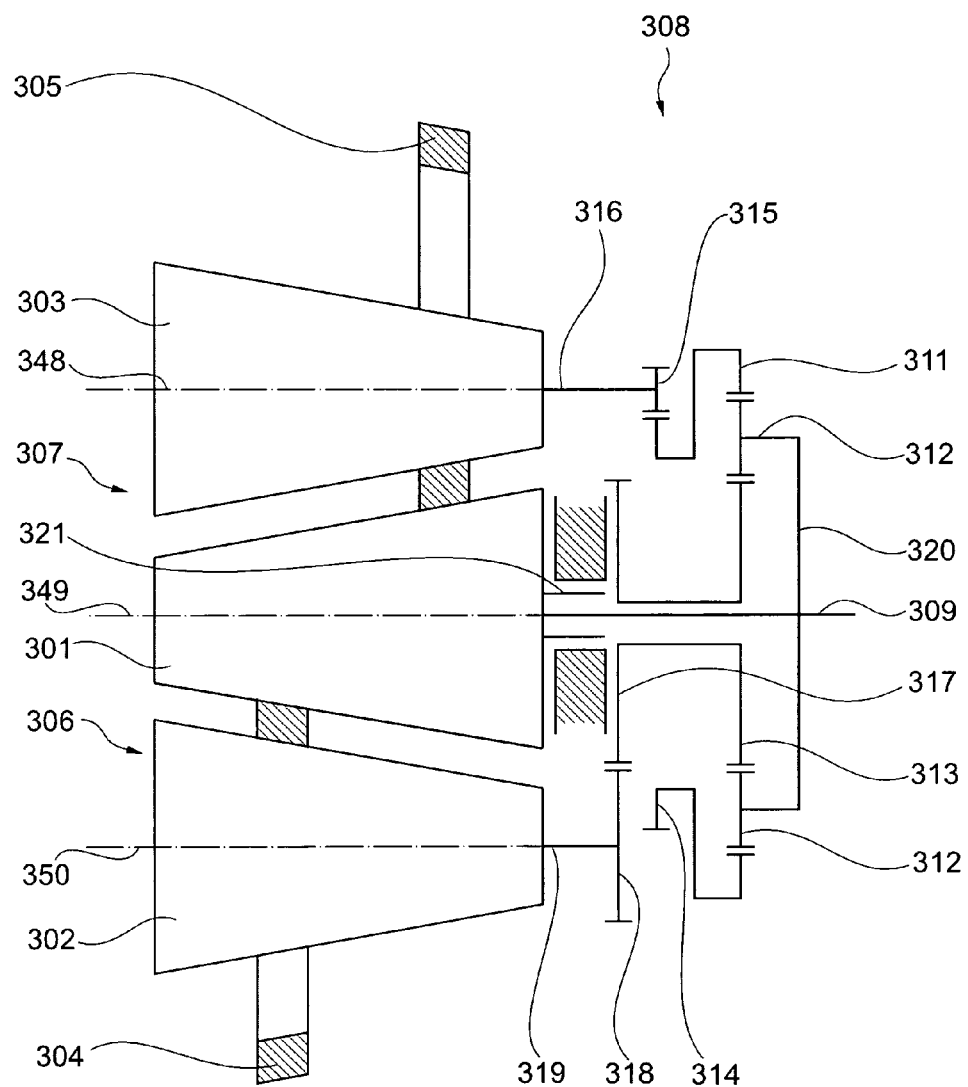
FIG. 21 shows a schematic illustration of a possible disassembly of the continuously variable transmission into two partial transmissions.

The continuously variable transmission shown in FIG. 21 has an input cone 301 and two output cones 302, 303, each of which is coupled via a friction ring 304, 305, which revolves around the particular output cone 302, 303, to the input cone 301. By displacing the friction rings 304, 305 along the gaps remaining between the cones 301, 302, 303, the partial transmissions 306 and 307, respectively, formed by the cones 301 and 302 or 301 and 303, respectively, may be varied continuously.

On the output side, the two partial transmissions 306, 307 and/or the two output cones 302, 303 are switched onto an output shaft 309 via a summation gear 308. In the exemplary embodiment shown in FIG. 21, the summation gear 308 comprises a planetary gear having an external collar 311, planet wheels 312, and a sun wheel 313. The external collar 311 is connected fixed to a further collar 314, which in turn engages with a pinion 315 which is positioned on the output shaft 316 of the cone 303. The sun wheel 313 is also connected fixed to a wheel 317 and revolves with it, which in turn engages with a pinion 318 which is positioned on the output shaft 319 of the cone 302. Furthermore, the planet wheels 312 are mounted in a mount 320 which is connected to the output shaft 309 and revolves together with the output shaft 309 and the planet wheels 312. Therefore, a summation gear 308 is provided in which the speeds of the pinions 315, 318 and/or of the output cones 302, 303 are added up to the total speed of the shaft 309 depending on the transmission ratio and the position of the friction rings 304, 305. The transmission ratios are preferably selected in such a way that with an identical position of the friction rings 304, 305, i.e., identical speeds of the two output cones 302, 303, the planet wheels 312 stand still in regard to their intrinsic rotation in the mount 320 and merely revolve together with the external collar 311 and the sun wheel 313. In this way, losses in continuous operation may be minimized. In addition, a clutch 321 is used to minimize loss, using which the output shaft 309 may be connected directly, or via a speed-change gear depending on the concrete embodiment, to the drive cone 301, so that particularly at high and relatively uniform speeds, at which the advantages of a continuously variable transmission may not be used in any case and continuously variable transmissions of this type lead to unnecessary losses, the two partial transmissions 306, 307 may be bypassed.

As is immediately obvious, the summation gear 308 adds up the speeds of the two cones 302, 303 and is also used as a torque balance for the torques applied to these cones 302, 303.

Figure 22:
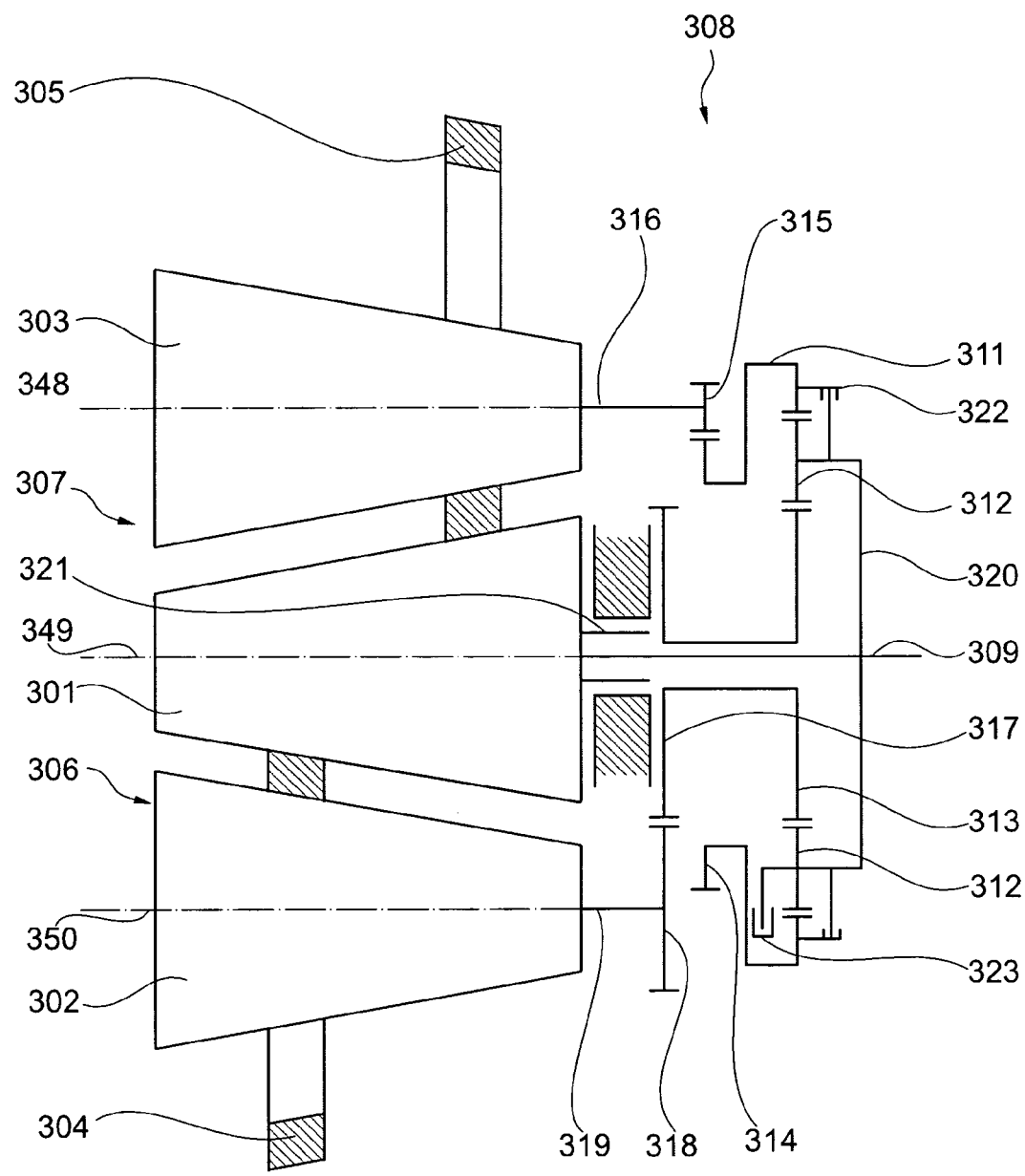
FIG. 22 shows the transmission in FIG. 21 with additional switching possibilities.

The exemplary embodiment shown in FIG. 22 essentially corresponds to the exemplary embodiment in FIG. 21, so that identically acting assemblies also have identical reference numbers and repetition of the identical functionalities will be dispensed with. In addition to the features of the exemplary embodiment in FIG. 21 the exemplary embodiment in FIG. 22 also has a fixing clutch 322, using which the revolving mount 320 of the planet wheels 312 may be fixed to the external collar 311, and, in addition, a clutch 323, using which the mount 320 and the output shaft 309 may be fixed to a fixed clutch housing (not shown in more detail). The first clutch 322 is used for the purpose of causing stoppage of the planet wheels 312 in their intrinsic rotation in certain operating states, so that losses due to the planet wheels 312 are avoided and the housing 320 and the shaft 309 revolve together with the external collar 311 and the sun wheel 313. The second clutch 323 is used for the purpose of keeping the planet wheels 312 fixed in place, but rotatable around their own axes. This arrangement is particularly provided for interaction with a transmission in which the transmission is designed in such a way that the external collar and the sun wheel 313 may and/or do revolve in opposite directions. This may be implemented, for example, through an additional interposed gearwheel or even by a separate reverse gear in the transmission path between at least one of the partial transmissions 306, 307 and the summation gear 308. In an arrangement of this type, the summation gear 308 may be activated via the two partial transmissions 306, 307 in such a way that a speed of 0 results on the shaft 309 even though the drive cone 301 rotates. In this state, the clutch 323 may be used to fix the transmission. In an arrangement of this type, it is then possible to start up the output shaft 309 merely by adjusting the friction rings 304, 305 and/or by adjusting the partial transmissions 306, 307.

Figure 23:
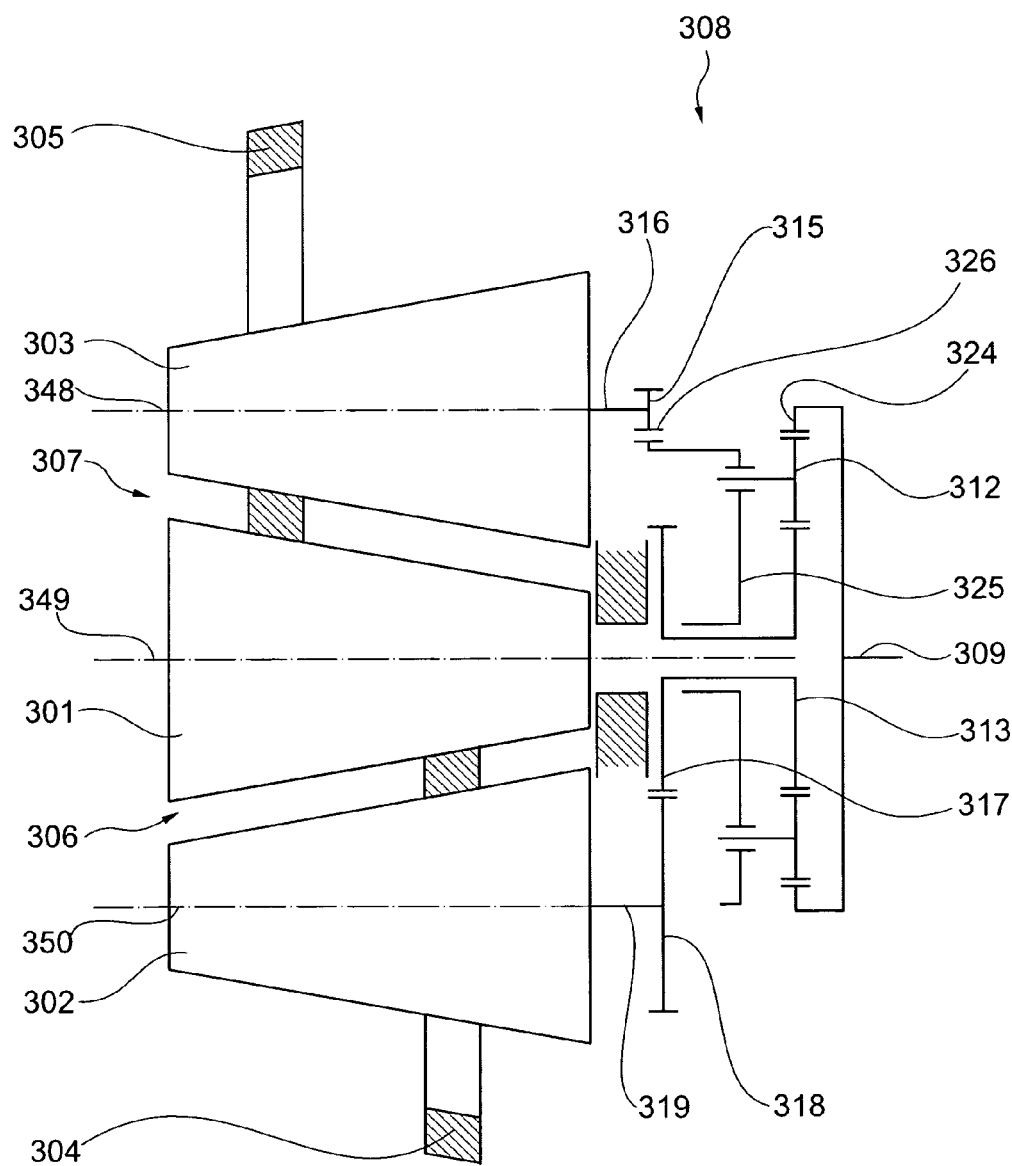
FIG. 23 shows a schematic illustration of a further possible disassembly of the continuously variable transmission into two partial transmissions in a similar illustration as in FIGS. 21 and 22.

The arrangement shown in FIG. 23 also essentially corresponds to the arrangement in FIG. 21. The partial transmissions 306, 307 of the two arrangements are thus identical. Only the summation gear 308 is implemented differently in the arrangement in FIG. 23 than in the arrangement in FIG. 21. For this reason, more detailed explanation of the corresponding components and their modes of operation will also be dispensed with here.

In the continuously variable transmission shown in FIG. 23, the output shaft 309 is connected directly to an external collar 324 of a planetary gear and revolves together with it. In addition, the planet wheels 312 are mounted in a mount 325 which may revolve together with the planet wheels 312 and a wheel 326, the wheel 326 engaging with the pinions 315 on the output shaft 306 of the cone 303. The sun wheel 313 is, in contrast, as in the exemplary embodiment in FIGS. 21 and 22, connected to a wheel 317 which engages with the pinions 318 on the output shaft 319 of the cone 2.

The gear 308 shown in FIG. 23 thus also acts as a summation gear and adds and/or subtracts the speeds of the two partial transmissions 306, 307.

Figure 24:
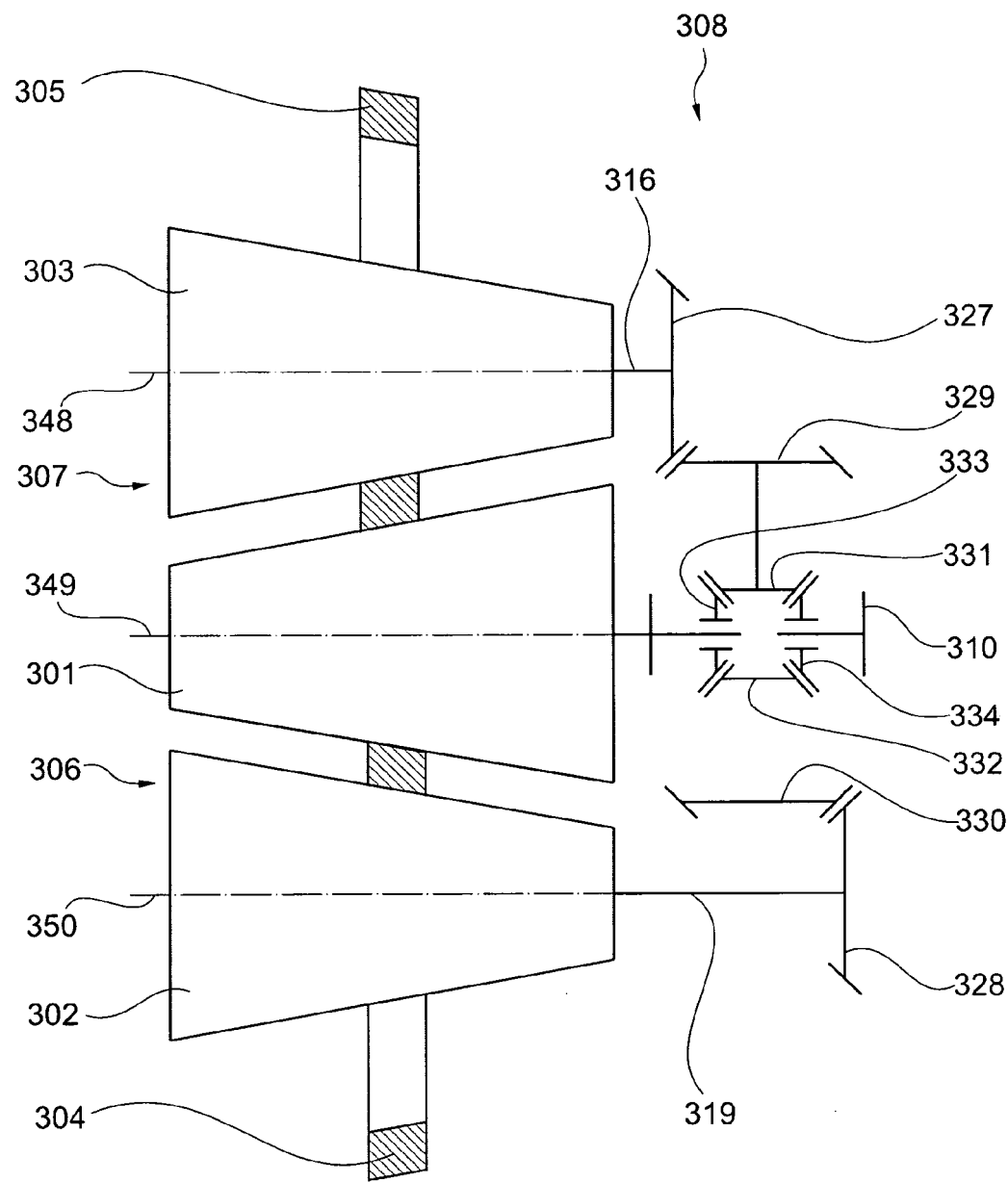
FIG. 24 shows a schematic illustration of a further possible disassembly of the continuously variable transmission into two partial transmissions in a similar illustration as in FIGS. 21 through 23.

The arrangement shown in FIG. 24 also essentially corresponds to the arrangement shown in FIGS. 21 through 23 in regard to its partial transmissions 306, 307. Essentially, only the gear 308 is implemented differently. In this case, the summation gear 308 is driven via bevel wheels 327 and 328, each of which is positioned on the output shaft 316 and 319, respectively, of the cones 303 and 302, respectively. For this purpose, the bevel wheels 327 and 328 engage with bevel wheels 329 and 330, respectively, which are n turn connected to the fixed bevel wheels 331 and 332, respectively, of the different-al, which rotate around their own axis. The output of the gear in FIG. 24 occurs via a gearwheel 310 which is connected to the axial bearings of the revolving bevel wheels 333 and 334 of the differential, which in turn engage with the bevel wheels 331 and 332, respectively, of the differential. As is immediately obvious, a summation gear is also provided by this arrangement.

Figure 25:
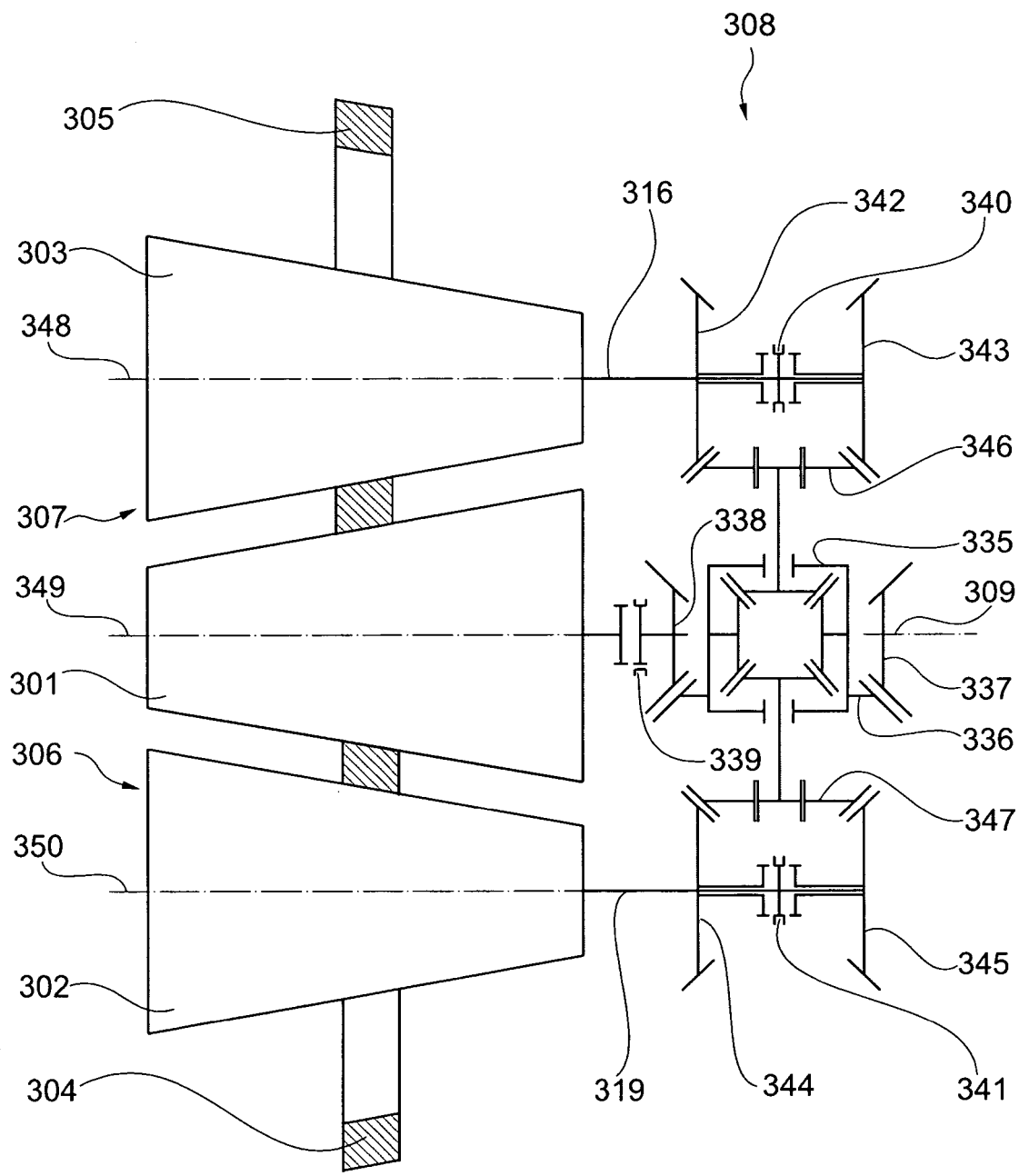
FIG. 25 shows a switching gear as in FIG. 24 with additional switching possibilities.

The basic construction of the exemplary embodiment in FIG. 25 corresponds to the exemplary embodiment in FIG. 24, so that here the summation gear 308 is also essentially formed by a differential 335, which drives the output shaft 309 via a bevel wheel 337 using an output wheel 336. In addition, the output wheel 336 engages with a bevel wheel 338, which is in turn connectable via a synchronized clutch 339 to the drive cone 301, so that the two partial transmissions 306, 307 may be bypassed as needed. In addition, in this arrangement the output shafts 316, 319 of the output cones 302, 303 are alternately switchable via synchronized clutches 340 and 341, respectively, to bevel wheels 342, 343 and 344, 345, respectively, which in turn engage with bevel wheels 346 and 347, respectively, each of which is connected to the bevel wheels of the differential, which revolve around a fixed axis. The active rotational direction of the partial transmissions 306, 307 may thus be changed easily by the clutches 340 and/or 341, so that the transmission in FIG. 25 has extremely versatile transmission behavior.

It is obvious that instead of the conical friction ring transmissions 306, 307 shown, other continuously variable transmissions may also advantageously be used as partial transmissions for continuously variable transmissions of this type according to the present invention. As is immediately obvious from FIGS. 21 through 25, the partial transmissions 306, 307 have partial transmission planes, defined by the particular cone axes 348, 349, 350, which are each aligned parallel to one another, which all lie in the plane of the drawing. In this way, the transmissions are built extremely flat and are particularly suitable for use in trucks and/or small trucks, since they may be provided below a loading surface, for example. It is all the more suitable since the transmission according to the present invention operate with good efficiency by using two partial transmissions even at higher torques, as are applied by modern diesel engines, because extremely high pressures may be avoided by using two partial transmissions.

As already indicated on the basis of the description and the exemplary embodiment in FIGS. 21 through 24 and explained for exemplary purposes on the basis of the exemplary embodiment in FIG. 25, the characteristic of the overall transmission may be significantly influenced through the selection of the rotational directions with which the partial transmissions 306, 307 act on the summation gear 308. In particular, reverse gears of this type and/or partial transmissions which change the rotational direction are advantageous. An alternative in this regard was explained in FIG. 10 as an example for the above-mentioned partial transmission 80.

It is obvious that in the transmissions shown in FIGS. 21 through 25, the force flow may also be selected as reversed, so that the output elements 309, 310 are used as input elements and the input cone 301 is used as the output cone.

As may be inferred from FIGS. 1, 4, 8, and 9 as well as 14 through 17, the continuously variable transmissions shown therein are each sealed in the direction of their bearings by seals 70 (only identified as examples). In this way, as is known from the related art, a separate fluid chamber arises, in which the cones and the coupling element are positioned. In the present exemplary embodiment, a "silicone oil", in which approximately 10 to 30 mole-percent of the methyl groups in polydimethyl siloxane are preferably replaced by phenyl groups and whose viscosity at 25° C. is preferably approximately 200 mm$^2$/sec., is preferably used as the fluid. However, any other fluid whose temperature dependence of its physical and chemical parameters is stabilized in relation to the temperature dependence of mineral oils and/or is located between the gradients of mineral oils and the gradients of silicone oil in regard to the temperature-dependent compression gradients and/or the temperature-dependent viscosity gradients, may be used.

Figure 26:
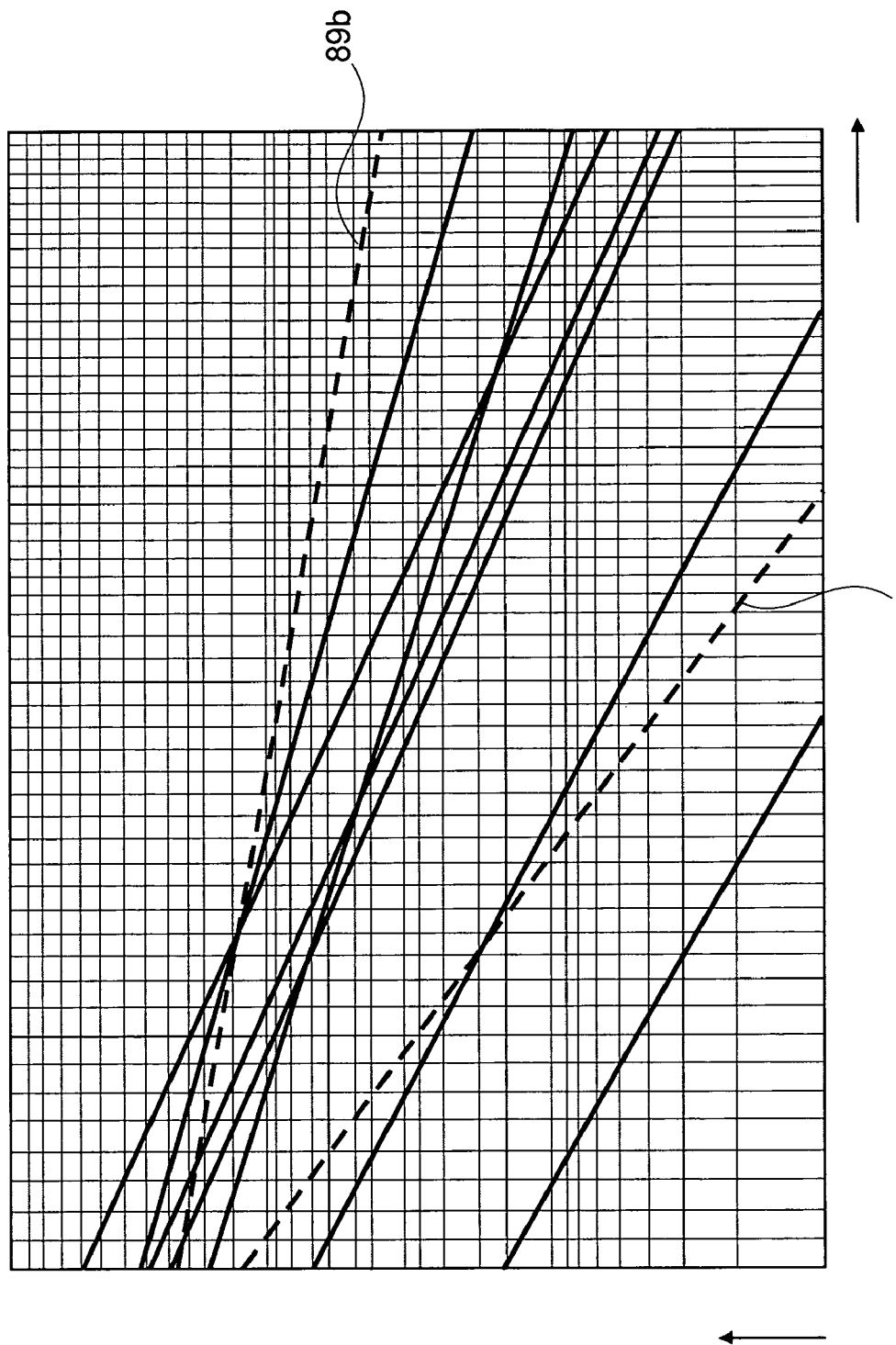
FIG. 26 shows the viscosity as a function of the temperature for exemplary silicone oils.

The temperature dependence of exemplary fluids and/or liquids described above is shown as an example in FIG. 26 in logarithmic form, the white line 89*a* representing mineral oils and the white line 89*b* representing silicone oil. These fluids ensure under operating conditions that a gap which is bridged by the fluid may form between the cones 4, 5; 51, 55, 81, 82, 91, 92, 104, 105, 203, 204, 301, 302, 303 and the coupling elements 7; 54, 83, 93, 107, 205, 304, 305. The existence of this gap may be detected in metallic components through electrical voltage measurements, for example, it having been experimentally determined that this gap is only formed after several rotations, i.e., when the fluid is distributed, so that the compressibility and the viscosity are to be selected suitably in regard to the gap dimension. In this case, the bracing and/or pressure devices are dimensioned in such a way that a corresponding gap is maintained in operating conditions.

In order to ensure uniform surface pressure for different running paths and therefore for different radii of the cones 4, 5; 51, 55, 81, 82, 91, 92, 104, 105, 203, 204, 301, 302, 303, the running surface 12 of each cone is preferably implemented as axially different. In the present exemplary embodiments, this is implemented through grooves of different widths (not shown). Alternatively, an axially varying surface roughness or something similar may be provided.

Figure 27:
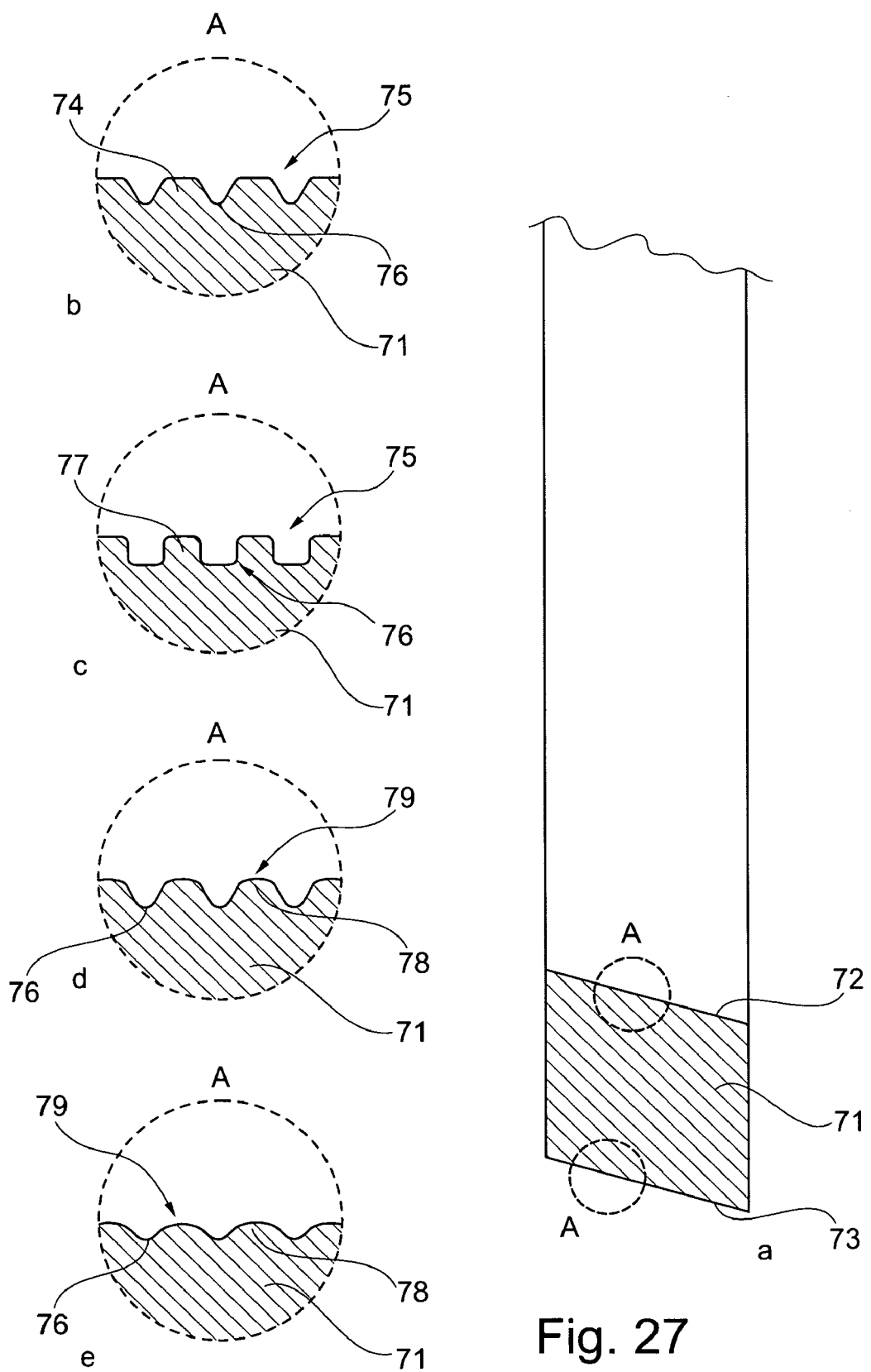

The surface of the friction ring 7; 54, 83, 93, 107, 205, 304, 305 is also preferably provided with grooves in order to influence the shear force of the liquid in the gaps remaining between the cones 4, 5; 51, 55, 81, 82, 91, 92, 104, 105, 203, 204, 301, 302, 303 and the friction ring 7; 54, 83, 93, 107, 205, 304, 305, as is shown for exemplary purposes in FIG. 27 on the basis of the friction ring 71. The friction ring 71 has two revolving surfaces 72, 73, each of which, as explained on the basis of the friction rings 7; 54, interacts with the surfaces of cones 4, 5; 51, 55, 81, 82, 91, 92, 104, 105, 203, 204, 301, 302, 303. In this case, the surfaces 72, 73 may have different surface designs. For example, trapezoidal webs 74 (cf. FIG. 27*b*) are especially advantageous, since they may support themselves especially well on the remaining material of the ring 71. Cumulatively and/or alternatively, rounded groove inlets (cf. FIGS. 27*b* and 27*c*) may be provided, through which inward flanges in a diametrically opposing surface may be avoided. Rounded groove inlets 75 also appear advantageous for the distribution of the oil film and/or the surface pressure. Rounded groove bases (76, cf. FIGS. 27*b*, 27*c*, and 27*d*), in contrast, may avoid notch effects in the groove bases under load. Essentially cuboid webs 77 (cf. FIG. 27*c*) may also be provided. The webs 78 having round external cross-sectional shapes 79 may also be used, as shown in FIGS. 27*d* and 27*e*.

Grooves of this type may be provided identically and/or differently both on the cones and, depending on the concrete embodiment, on the friction ring surfaces. In particular, the distribution of the grooves and/or webs may vary over a surface, particularly in the axial direction. In this way, for example, the surface pressure and/or surface pressure distribution may be varied and/or set suitably even along a cone and/or the oil film thickness may be adapted. The groove cross-section in particular largely determines the drain quantity of the oil from the contact zone of the particular transmission element in this case.

In addition, the friction ring preferably has a crowned cross-section, so that in spite of the existence of a gap, the largest possible contact area may be implemented via a Hertzian stress.

The friction ring 7, 54, 83, 93, 107, 205, 304, 305 per se (numbered as 7, 54 in FIGS. 28 through 31 only for exemplary purposes) is held in a known way in the present exemplary embodiments by a cage 90, on which an actuating bridge 91 runs and which is mounted so it is rotatable around an axis 92, as shown in FIG. 28. However, contrary to the related art, the actuating bridge 91 may not run freely if the angle of the cage 90 changes, but rather is positively controlled on a spindle 94, mounted on the housing 32 so it is rotatable, via an actuator 93. In this case, sufficient play is provided between the actuator 93 and the actuating bridge 91 so that a displacement of the actuator 93 first leads to a change of the angle of the cage 90, after which the ring 7, 54, 83, 93, 107, 205, 304, 305 is correspondingly displaced in its axis of rotation and then the movement of the actuator 93 follows.

Since the angle for an adjustment of the ring 7, 54, 83, 93, 107, 205, 304, 305 under its own power is critical, a pretension in regard to the angle of the cage 90 is implemented in this exemplary embodiment by a spring 95 between housing 32 and cage 90, so that the play between actuating bridge 91 and actuator 93 may, not lead to an unintentional change of the angle of the cage 90, as is schematically shown in FIG. 29.

In addition, there are end stops 96 on the housing 32 (shown for exemplary purposes in FIG. 30), against which the actuating bridge 91 may run, these end stops being positioned in such a way that the ring 7, 54, 83, 93, 107, 205, 304, 305 is aligned parallel to the cone axes in regard to its axis of rotation and therefore no longer travels. In this way, total destruction of the transmission may be counteracted if the positioning device for the ring breaks down. Sensors may also be provided at this point which display a corresponding position of the actuating bridge 91.

An alternative adjustment possibility 97 is shown in FIG. 31, this embodiment variation being built extremely cost-effectively. In this embodiment variation, the ring 7, 54, 83, 93, 107, 205, 304, 305 is guided on only one side by a holding device 98. This holding device is provided on the approach side, so that in the illustration selected, the ring 7, 54, 83, 93, 107, 205, 304, 305, starting from the holding device 98, first passes the gap between the cones 4, 5; 51, 55, 81, 82, 91, 92, 104, 105, 203, 204, 301, 302, 303 and then revolves around the cone 5; 51, 81, 91, 105, 203, 302, 303 before it reaches the holding device 98 again. The holding device 98 is mounted on a spindle 99 and encloses the ring with sufficient play so that it may displace the angle of its axis of rotation out of the plane formed by the cone axes, through which it performs a traveling movement and follows the movement of the holding device 98 under its own power. As an alternative to the play of the holding device 98, it may be provided with a rotational degree of freedom in the plane of the drawing of FIG. 31 in relation to the actuator 99, implemented as a spindle, and guide the ring essentially without play.

If the ring 7, 54, 83, 93, 107, 205, 304, 305 is implemented in such a way that it has a torque perpendicular to its axis of rotation, a holding device which only guides the ring 7, 54, 83, 93, 107, 205, 304, 305 on one side on a rest 100 may be provided, which counteracts this torque and—depending on the desired displacement—moves away from the ring, so that it completes a rotational movement of its axis of rotation out of the plane formed by the cone axes under its own power and begins to travel until it reaches the guide, which appropriately aligns it again, or the axis of rotation of the ring pivots in that it moves toward it, so that it moves away from the guide until the guide no longer follows it and it pivots back toward its axis of rotation through its own torque again until it has reached the guide again.

The latter arrangement allows the ring 7, 54, 83, 93, 107, 205, 304, 305 an especially large amount of play, so that it may move very independently and in a self-stabilizing way, through which friction losses may be minimized.

The invention claimed is:

1. A revolving transmission having at least two revolving transmission elements, which transmit a torque frictionally via a coupling element, said coupling element being positionable at different running paths of at least one of said revolving transmission elements, wherein said two revolving transmission elements are cones; and
   wherein the running paths of at least one revolving transmission element have different surfaces.

2. The transmission according to claim 1, wherein grooves or projections of different widths and a varying surface texture and surface treatment are provided axially along at least one of the revolving transmission elements.

3. The transmission according to claim 1, wherein the coupling element has at least one running surface having a textured surface.

4. The transmission according to claim 3, wherein at least one running surface has grooves.

5. A revolving transmission having at least two revolving transmission elements, which transmit a torque frictionally via a coupling element, said coupling element surrounding at least one of said revolving transmission elements, and said coupling element being positionable at different running paths of at least one of said revolving transmission elements,
   wherein the running paths of at least one revolving transmission element have different surfaces.

6. The transmission according to claim 5,
   wherein said two revolving transmission elements are cones, and that a ring is positioned between said cones surrounding one of said cones.

7. The transmission according to claim 5,
   wherein grooves or projections of different widths and a varying surface texture and surface treatment are provided axially along at least one of the revolving transmission elements.

8. The transmission according to claim 7,
   wherein the coupling element has at least one running surface having a cross-section deviating from a straight line.

9. The transmission according to claim 7,
   wherein the coupling element has at least one running surface having a cross-section deviating from a straight line selected from the group consisting of a concave cross-section and a crowned cross-section.

10. The transmission according to claim 7,
    wherein said two revolving transmission elements are cones, and that a ring is positioned between said cones surrounding one of said cones.

11. The transmission according to claim 5,
    wherein the coupling element has at least one running surface having a textured surface.

12. The transmission according to claim 11, wherein at least one running surface has grooves.

13. A revolving transmission having at least two revolving transmission elements, which transmit a torque frictionally via a coupling element, said coupling element surrounding at least one of said revolving transmission elements, and said coupling element being positionable at different running paths of at least one of said revolving transmission elements,
    wherein the coupling element has at least one running surface having a textured surface.

14. The transmission according to claim 13,
    wherein the running paths of at least one revolving transmission element have different surfaces.

15. The transmission according to claim 13, wherein at least one running surface has grooves.

16. A revolving transmission having at least two revolving transmission elements, which may transmit a torque frictionally via a coupling element, said coupling element surrounding at least one of said revolving transmission elements, and said coupling element being positionable at different running paths of at least one of said revolving transmission elements,
    wherein the coupling element has at least one running surface having a cross-section deviating from a straight line.

17. The transmission according to claim 16,
    wherein a liquid wets the running surface of the coupling element.

18. The transmission according to claim 16, wherein at least one first of said transmission elements is incontact with said coupling element, and that a liquid wets the running surface of first transmission element.

19. The transmission according to claim 16, wherein the cross-section is selected from the group consisting of concave and crowned.

20. A transmission having two revolving transmission elements, each of which has at least one running surface for a revolving coupling element, said at least one running surface having at least two running paths for the coupling element having different running radii, having a reverse gear (202) provided behind an output (204) in series with the continuously variable transmission (201)
    wherein the reverse gear (202) comprises a planetary gear (210, 211) having planet wheels (215, 216), sun wheel (209, 212), and external wheel (217, 218), of which a first transmission element (209, 212) is mechanically connected to an output (207) of the conical friction ring transmission (201) and a second transmission element (217, 218) is mechanically connected to an output (220, 223) of the overall arrangement made of transmission (201) and reverse gear (202), while a third transmission element (215, 216) is fixed in regard to at least one degree of freedom in relation to a mount or housing (227, 232), in order to realize a reverse gear.

21. The transmission according to claim 20,
    wherein said revolving coupling element is a revolving ring.

22. The transmission according to claim 20,
    wherein at least one of said revolving transmission elements is a cone.

23. The transmission according to claim 20,
    wherein the reverse gear comprises an epicyclic gear having at least one revolving gear mount (225, 226), which mounts at least one transmission element (215, 216) of the epicyclic gear and may be fixed alternately with a fixed mount (227, 232) and a revolving transmission element (209, 217; 212, 218).

24. The transmission according to claim 20,
    wherein the third transmission element is the planet wheels.

25. The transmission according to claim 20,
    wherein the first transmission element is driven by a pinion (207) which revolves with the output cone.

26. The transmission according to claim 20, wherein the second transmission element revolves connected to the revolving mount (219) of a differential (220).

27. The transmission according to claim 20, wherein two of the transmission elements are fixed with one another.

28. The transmission according to claim 27, wherein a clutch (229), a slanted brake (227, 228), and a synchronization (230) is used for fixing.

29. The transmission according to claim 27, wherein the first and second transmission elements are fixed with one another.

* * * * *